(12) United States Patent
Lee et al.

(10) Patent No.: US 10,656,944 B2
(45) Date of Patent: *May 19, 2020

(54) HARDWARE APPARATUS AND METHODS TO PREFETCH A MULTIDIMENSIONAL BLOCK OF ELEMENTS FROM A MULTIDIMENSIONAL ARRAY

(71) Applicant: INTEL CORPORATION, Santa Clara, CA (US)

(72) Inventors: Victor Lee, Santa Clara, CA (US); Mikhail Smelyanskiy, Burlingame, CA (US); Alexander Heinecke, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/004,081

(22) Filed: Jun. 8, 2018

(65) Prior Publication Data

US 2019/0138309 A1   May 9, 2019

Related U.S. Application Data

(63) Continuation of application No. 14/583,651, filed on Dec. 27, 2014, now Pat. No. 9,996,350.

(51) Int. Cl.
  *G06F 9/30* (2018.01)
  *G06F 9/345* (2018.01)
  (Continued)

(52) U.S. Cl.
  CPC ...... *G06F 9/30047* (2013.01); *G06F 9/30145* (2013.01); *G06F 9/34* (2013.01);
  (Continued)

(58) Field of Classification Search
  None
  See application file for complete search history.

(56) References Cited

U.S. PATENT DOCUMENTS 5,749,084 A   5/1998 Huck et al.
5,903,769 A   5/1999 Arya
(Continued)

FOREIGN PATENT DOCUMENTS

CN   1332870 A   1/2002
CN   1656495 A   8/2005
(Continued)

OTHER PUBLICATIONS

Abandonment from U.S. Appl. No. 16/036,883, dated Apr. 3, 2019, 2 pages.
(Continued)

*Primary Examiner* — Corey S Faherty
(74) *Attorney, Agent, or Firm* — Nicholson De Vos Webster & Elliott LLP

(57) ABSTRACT

Methods and apparatuses relating to a prefetch instruction to prefetch a multidimensional block of elements from a multidimensional array into a cache. In one embodiment, a hardware processor includes a decoder to decode a prefetch instruction to prefetch a multidimensional block of elements from a multidimensional array into a cache, wherein at least one operand of the prefetch instruction is to indicate a system memory address of an element of the multidimensional block of elements, a stride of the multidimensional block of elements, and boundaries of the multidimensional block of elements, and an execution unit to execute the prefetch instruction to generate system memory addresses of the other elements of the multidimensional block of elements, and load the multidimensional block of elements into the cache from the system memory addresses.

24 Claims, 16 Drawing Sheets

(51) Int. Cl.
  *G06F 12/02* (2006.01)
  *G06F 12/0811* (2016.01)
  *G06F 12/0862* (2016.01)
  *G06F 9/34* (2018.01)
  *G06F 12/0875* (2016.01)

(52) U.S. Cl.
  CPC ........ *G06F 9/3455* (2013.01); *G06F 12/0207* (2013.01); *G06F 12/0811* (2013.01); *G06F 12/0862* (2013.01); *G06F 12/0875* (2013.01); *G06F 2212/452* (2013.01); *G06F 2212/6026* (2013.01)

(56) References Cited

U.S. PATENT DOCUMENTS

| | | |
|---|---|---|
| 6,253,287 B1 | 6/2001 | Green |
| 6,662,288 B1 | 12/2003 | Hamada et al. |
| 7,493,451 B2 | 2/2009 | Kadambi et al. |
| 7,533,242 B1 | 5/2009 | Moll et al. |
| 9,519,947 B2 | 12/2016 | Nickolls et al. |
| 2003/0154349 A1 | 8/2003 | Berg et al. |
| 2004/0044847 A1 | 3/2004 | Ray et al. |
| 2004/0117422 A1 | 6/2004 | Debes et al. |
| 2004/0181646 A1 | 9/2004 | Ben-David et al. |
| 2006/0047890 A1 | 3/2006 | Van De Waerdt |
| 2006/0227966 A1 | 10/2006 | Knowles et al. |
| 2007/0150697 A1 | 6/2007 | Sachs |
| 2007/0283106 A1 | 12/2007 | Kalogeropulos et al. |
| 2009/0307656 A1 | 12/2009 | Eichenberger et al. |
| 2010/0217958 A1 | 8/2010 | Symes et al. |
| 2012/0216011 A1 | 8/2012 | Gove et al. |
| 2013/0339678 A1 | 12/2013 | Plotnikov et al. |
| 2014/0052956 A1 | 2/2014 | Moll |
| 2014/0201497 A1 | 7/2014 | Plotnikov et al. |
| 2016/0188337 A1 | 6/2016 | Lee et al. |

FOREIGN PATENT DOCUMENTS

| | | |
|---|---|---|
| CN | 1714401 A | 12/2005 |
| CN | 101110829 A | 1/2008 |
| CN | 101208658 A | 6/2008 |
| JP | 2001-166989 A | 6/2001 |
| JP | 2003-177961 A | 6/2003 |
| JP | 2005-174341 A | 6/2005 |
| JP | 2008-009857 A | 1/2008 |
| JP | 2008158662 A | 7/2008 |
| JP | 2008-269450 A | 11/2008 |
| JP | 2009-098934 A | 5/2009 |
| TW | 280890 B | 7/1996 |
| TW | 200802083 A | 1/2008 |
| TW | 200805146 A | 1/2008 |
| TW | 201140435 A | 11/2011 |
| WO | 2005104027 A2 | 11/2005 |

OTHER PUBLICATIONS

Abandonment from U.S. Appl. No. 16/051,377, dated Apr. 16, 2019, 2 pages.
Communication pursuant to Rules 70(2) and 70a(2) EPC for Application No. 15874043.1, dated Jul. 27, 2018, 1 page.
DB2 Version 9 product, feature and packaging information, calculating offset values, IBM, updated Jan. 27, 2011, 3 pages.
Extended European Search Report for Application No. 15874043.1, dated Jul. 10, 2018, 8 pages.
Final Office Action from U.S. Appl. No. 15/346,531, dated Nov. 16, 2017, 10 pages.
International Preliminary Report on Patentability for Application No. PCT/US2011/067078, dated Jul. 3, 2014, 7 pages.
International Preliminary Report on Patentability for Application No. PCT/US2015/062704, dated Jul. 6, 2017, 10 pages.
International Preliminary Report on Patentability for Applications No. PCT/US2011/067248, dated Jul. 3, 2014, 6 pages.
International Search Report and the Written Opinion for Applications No. PCT/US2011/067078, dated Aug. 27, 2012, 10 pages.
International Search Report and the Written Opinion for Applications No. PCT/US2011/067248, dated Aug. 29, 2012, 9 pages.
International Search Report and Written Opinion for Application No. PCT/US2015/062704, dated Mar. 8, 2016, 13 pages.
Non-Final Office Action from U.S. Appl. No. 13/976,004, dated Jan. 35, 2016, 19 pages.
Non-Final Office Action from U.S. Appl. No. 13/997,998, dated Jan. 21, 2016, 16 pages.
Non-Final Office Action from U.S. Appl. No. 14/583,651, dated Jun. 30, 2017, 11 pages.
Non-Final Office Action from U.S. Appl. No. 15/346,531, dated Apr. 36, 2017, 16 pages.
Non-Final Office Action from U.S. Appl. No. 15/363,785, dated Sep. 7, 2017, 13 pages.
Notice of Allowance from U.S. Appl. No. 14/583,651, dated Feb. 2, 2018, 15 pages.
Notice of Allowance for U.S. Appl. No. 13/976,004, dated Jul. 20, 2016, 5 pages.
Notice of Allowance from foreign counterpart Taiwan Patent Application No. 101147787, dated Sep. 25, 2013, 3 pages.
Notice of Allowance from U.S. Appl. No. 13/997,998, dated Jun. 20, 2016, 5 pages.
Notice of Allowance from U.S. Appl. No. 15/346,531, dated Mar. 28, 2018, 11 pages.
Notice of Allowance from U.S. Appl. No. 15/363,785, dated Mar. 14, 2018, 6 pages.
Notice on Grant of Patent Right for Invention from foreign counterpart Chinese Patent Application No. 201180075871.4, dated Jul. 7, 2017, 4 pages.
Office action and Search Report from foreign counterpart Taiwan Patent Application No. 101148751, dated Aug. 27, 2015, 10 pages.
Office action from foreign counterpart Chinese Patent Application No. 201180075871.4, dated May 23, 2016, 15 pages.
Office action from foreign counterpart Chinese Patent Application No. 201180076286.6, dated Feb. 15, 2016, 13 pages.
Restriction Requirement from U.S. Appl. No. 14/583,651, dated Mar. 14, 2017, 6 pages.
Second Office Action from foreign counterpart Chinese Patent Application No. 201180075871.4, dated Feb. 4, 2017, 8 pages.
The Math Works, Inc., "MATLAB, Multidimensional Array", Feb. 1, 2001, 14 pages, [retrieved on Dec. 28, 2015]. Retrieved from the Internet: URL: http :// www. mathworks. com /help/matlab/math/multidimensional-arrays.html.
Notice of Reasons for Refusal, JP App. No. 2017-528210, dated Oct. 29, 2019, 9 pages with English Translation.
Communication pursuant to Rules 71(3) EPC for Application No. 15874043.1, dated Dec. 19, 2019, 77 pages.
Office Action, CN App. No. 201580064660.9, dated Mar. 4, 2020, 10 pages (4 pages of English Translation and 6 pages of Original Document).

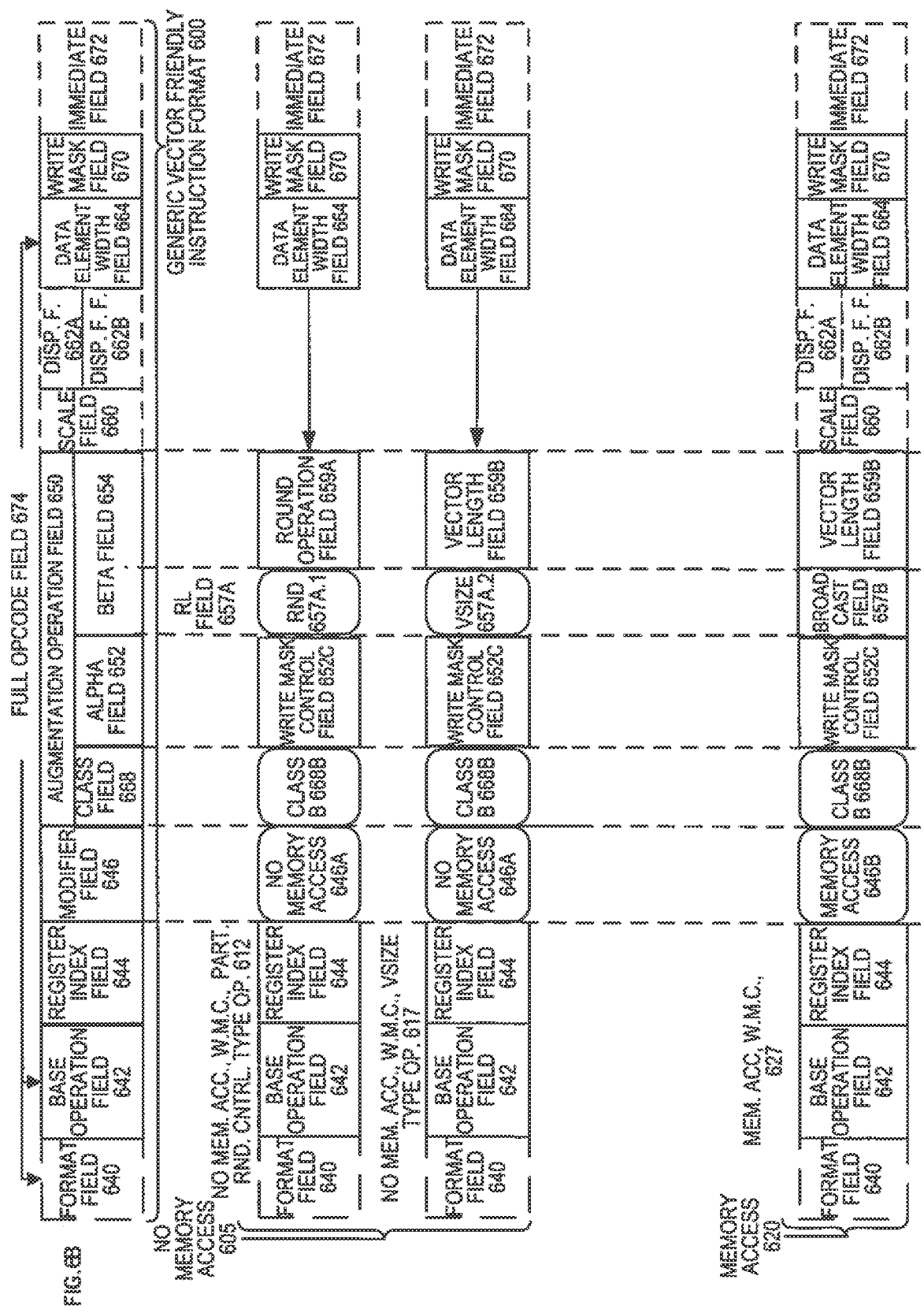

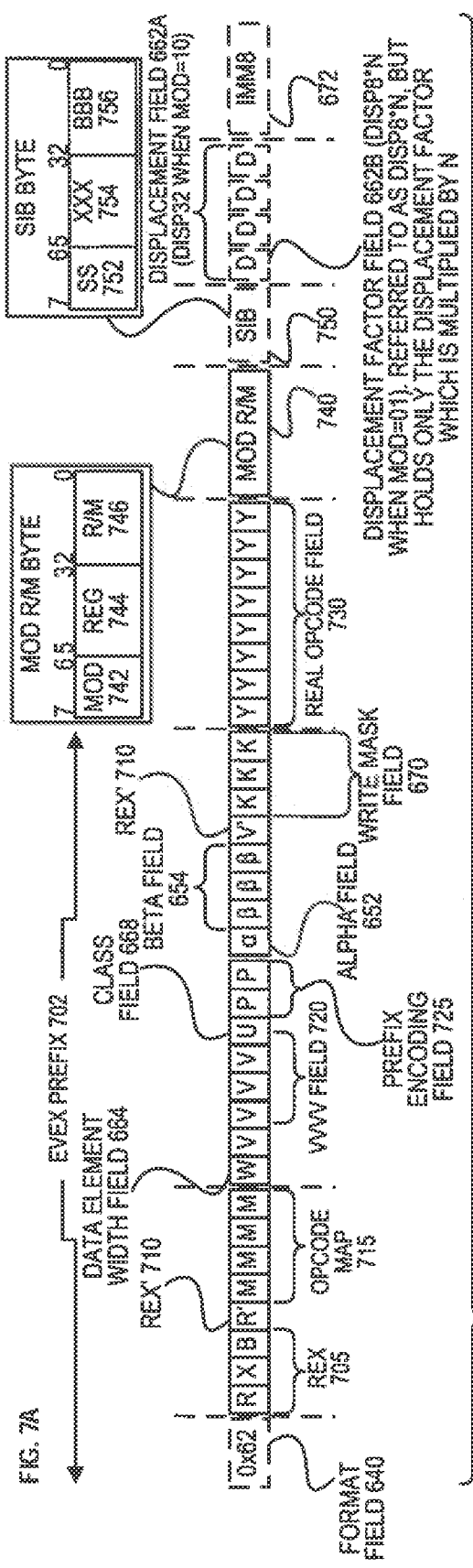
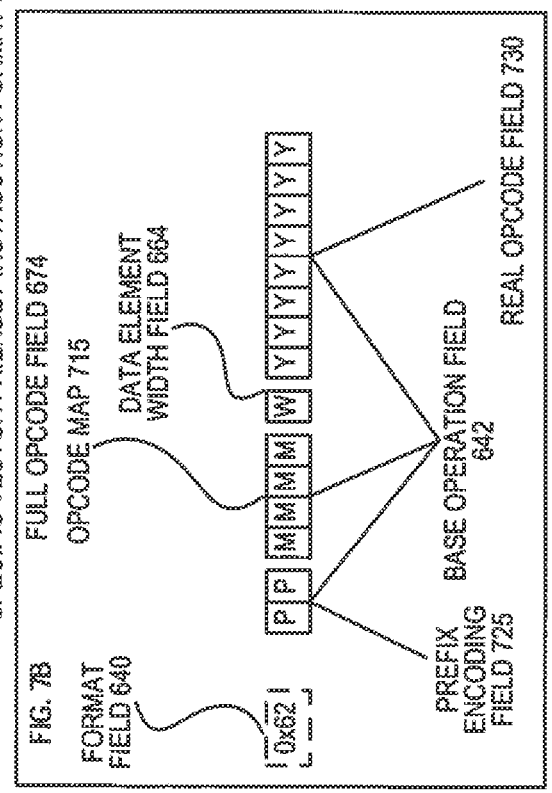
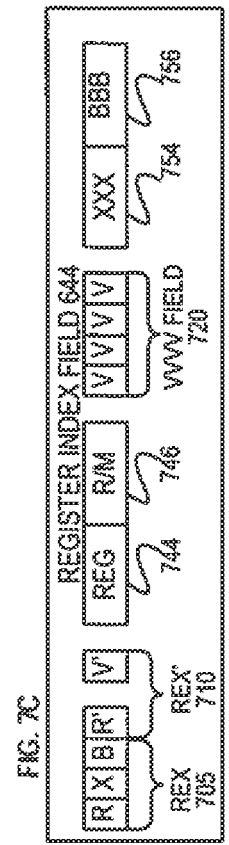

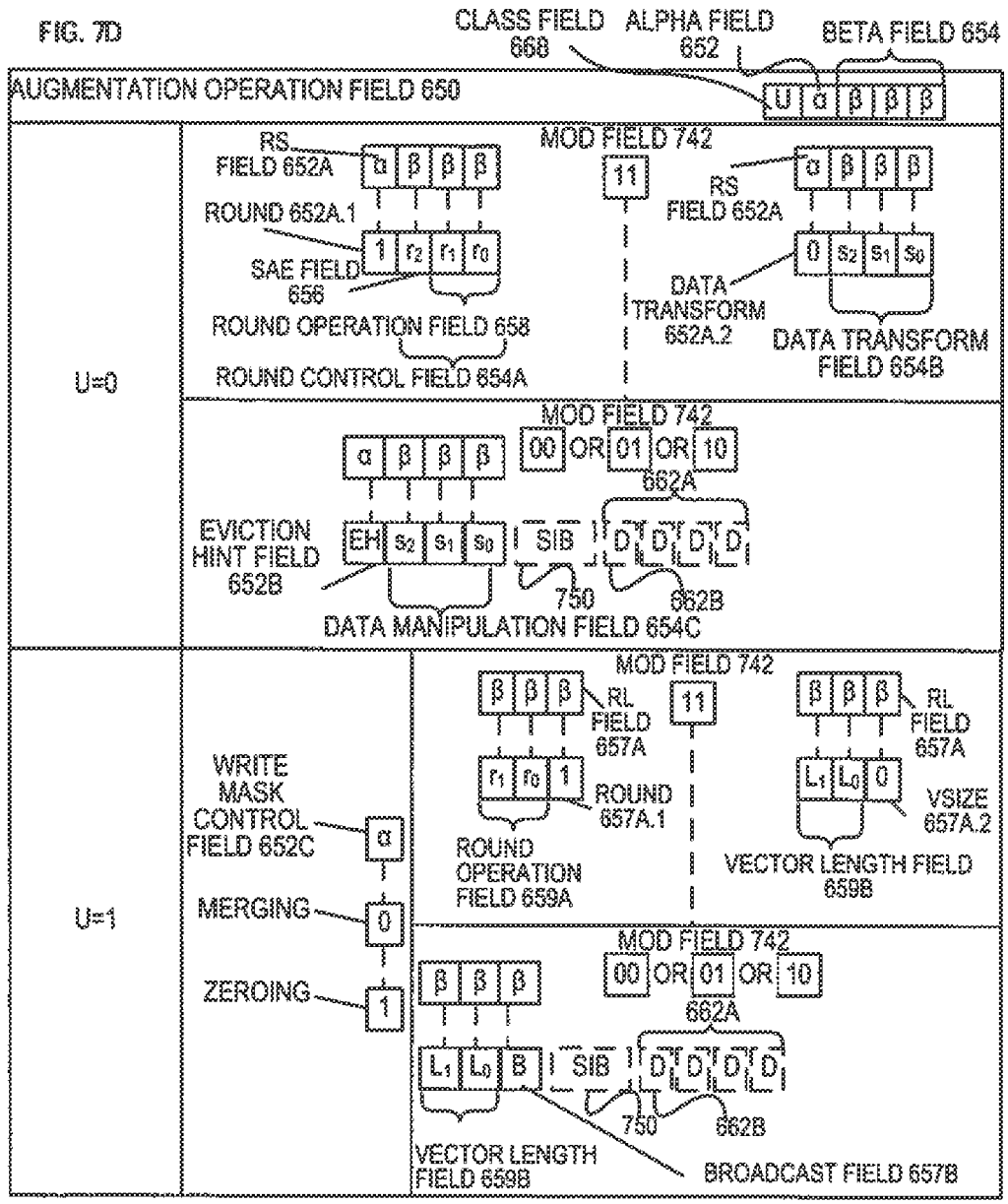

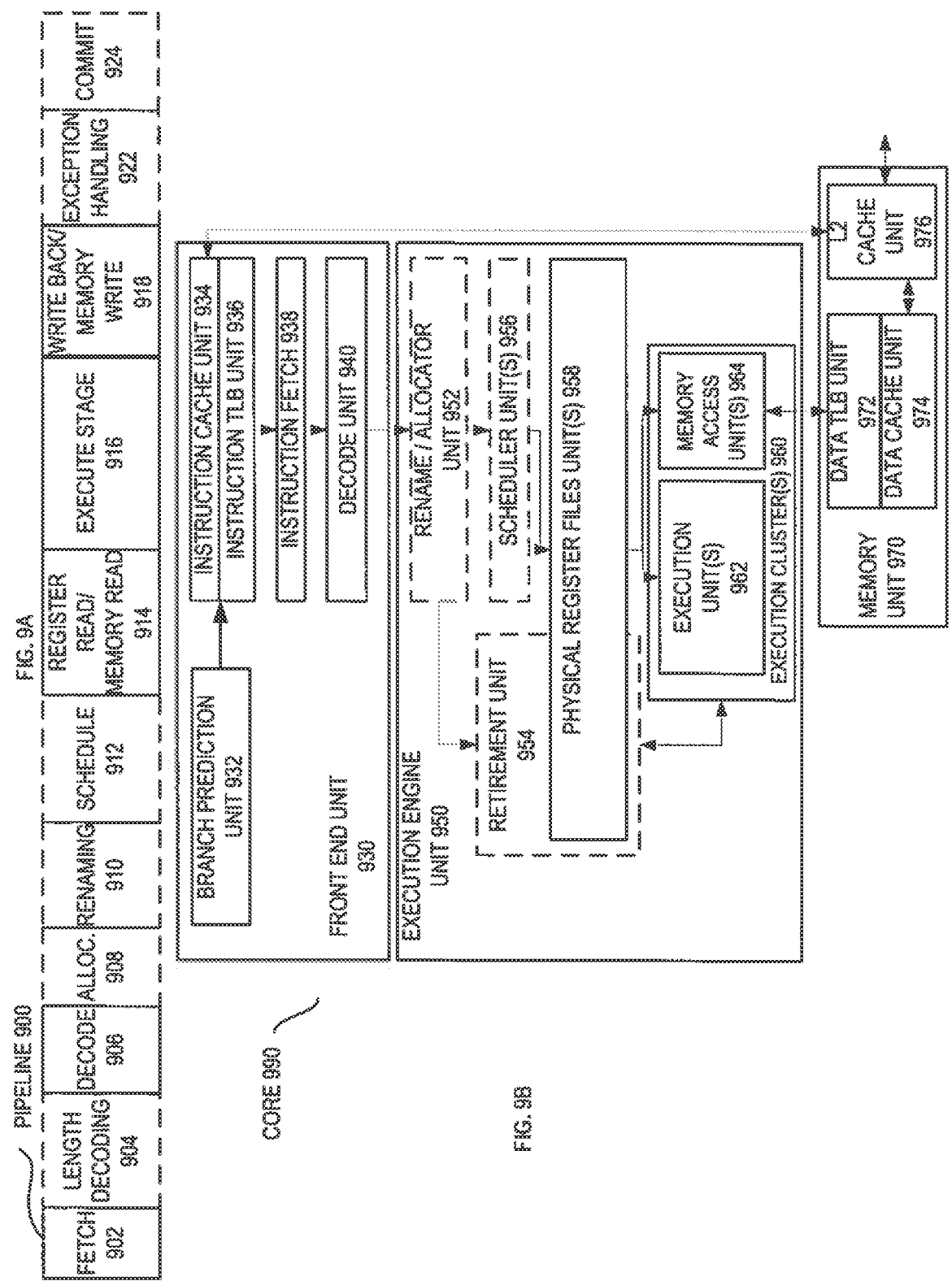

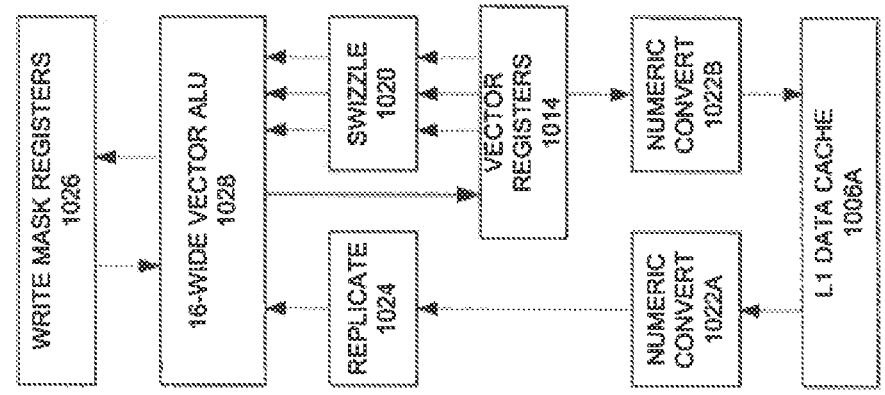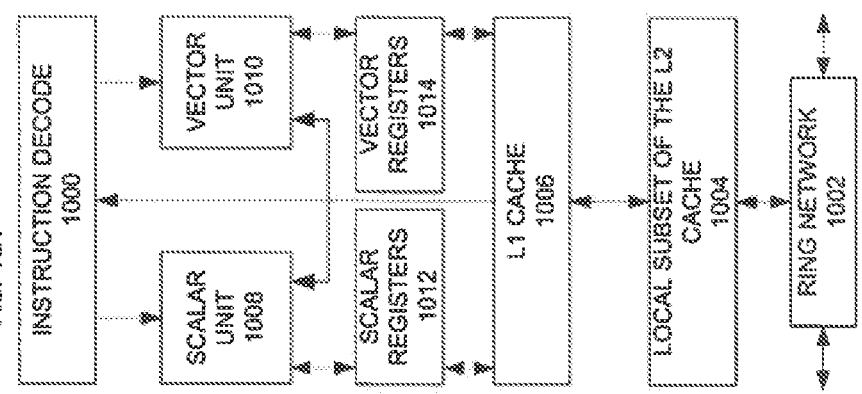

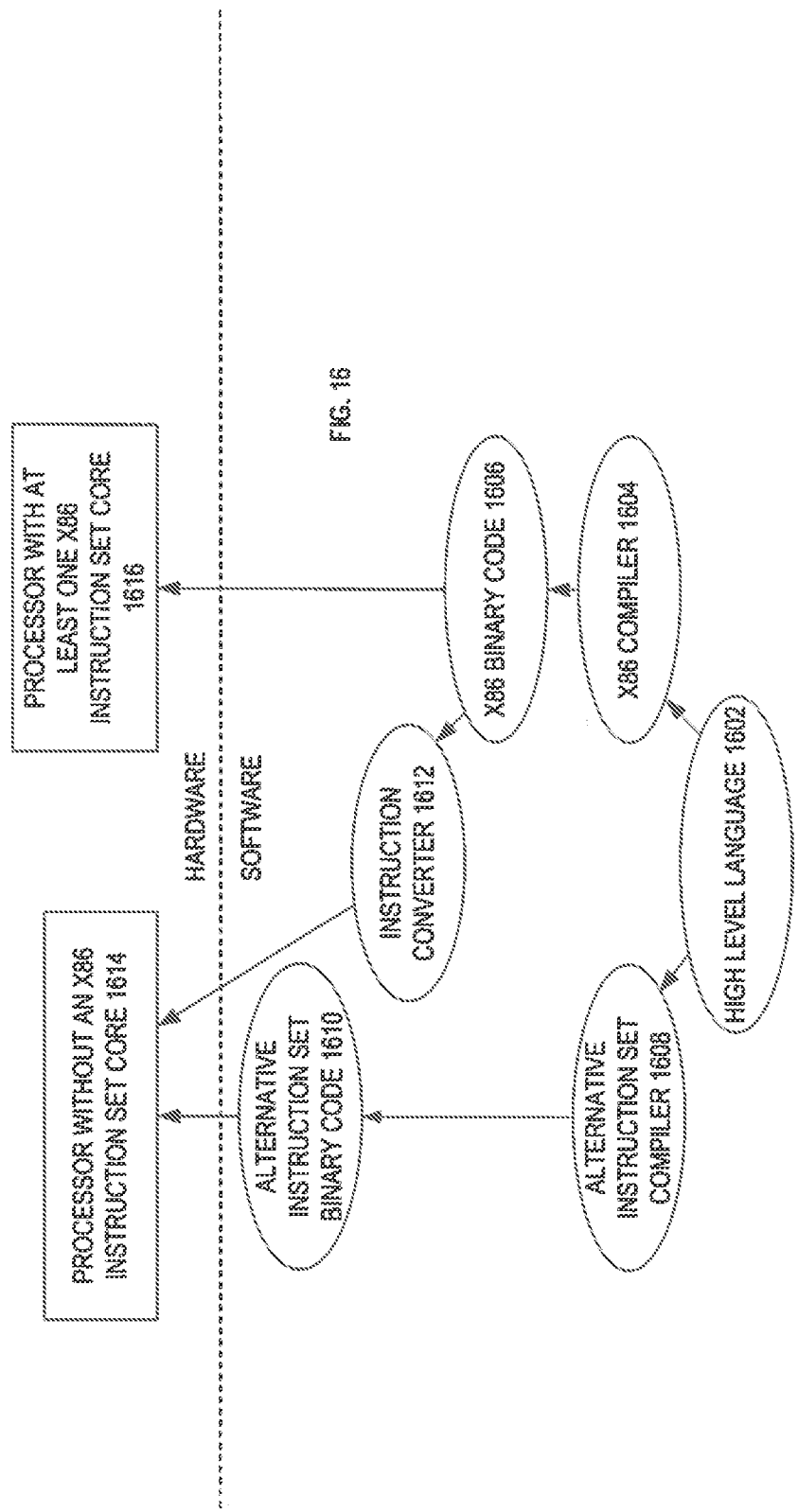

HARDWARE APPARATUS AND METHODS TO PREFETCH A MULTIDIMENSIONAL BLOCK OF ELEMENTS FROM A MULTIDIMENSIONAL ARRAY

CROSS-REFERENCE TO RELATED APPLICATIONS

The present patent application is a continuation application claiming priority from U.S. patent application Ser. No. 14/583,651, filed Dec. 27, 2014, and titled: "Hardware Apparatuses and Methods to Prefetch a Multidimensional Block of Elements from a Multidimensional Array", which is incorporated herein by reference in its entirety.

TECHNICAL FIELD

The disclosure relates generally to electronics, and, more specifically, an embodiment of the disclosure relates to prefetching a multidimensional block of elements from a multidimensional array.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 6B is a block diagram illustrating the generic vector friendly instruction format and class B instruction templates thereof according to embodiments of the disclosure.

FIG. 7A is a block diagram illustrating fields for the generic vector friendly instruction formats in FIGS. 6A and 6B according to embodiments of the disclosure.

FIG. 7B is a block diagram illustrating the fields of the specific vector friendly instruction format in FIG. 7A that make up a full opcode field according to one embodiment of the disclosure.

FIG. 7C is a block diagram illustrating the fields of the specific vector friendly instruction format in FIG. 7A that make up a register index field according to one embodiment of the disclosure.

FIG. 7D is a block diagram illustrating the fields of the specific vector friendly instruction format in FIG. 7A that make up the augmentation operation field 650 according to one embodiment of the disclosure.

FIG. 9A is a block diagram illustrating both an exemplary in-order pipeline and an exemplary register renaming, out-of-order issue/execution pipeline according to embodiments of the disclosure.

FIG. 9B is a block diagram illustrating both an exemplary embodiment of an in-order architecture core and an exemplary register renaming, out-of-order issue/execution architecture core to be included in a processor according to embodiments of the disclosure.

FIG. 10A is a block diagram of a single processor core, along with its connection to the on-die interconnect network and with its local subset of the Level 2 (L2) cache, according to embodiments of the disclosure.

FIG. 10B is an expanded view of part of the processor core in FIG. 10A according to embodiments of the disclosure.

FIG. 16 is a block diagram contrasting the use of a software instruction converter to convert binary instructions in a source instruction set to binary instructions in a target instruction set according to embodiments of the disclosure.

DETAILED DESCRIPTION

Figure 1:
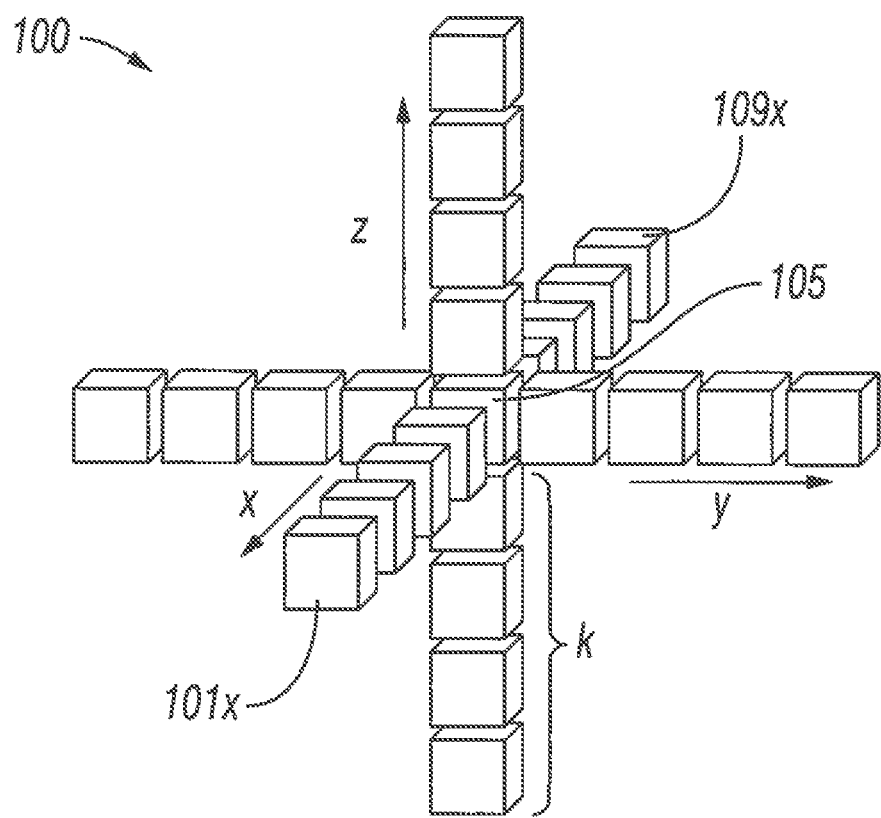
FIG. 1 illustrates a sparse three-dimensional stencil according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Instruction processing hardware (e.g., a hardware processor having one or more cores to decode and/or execute instructions) may operate on data, for example, in performing arithmetic or logic functions. A processor accessing (e.g., loading or storing) the data may be forced to wait for the data to arrive, for example, where the processor is waiting for the data and not processing anything (e.g., sitting idle). In certain embodiments, a hardware processor may load (e.g., copy) data to be operated on by the processor from a slower (e.g., access and/or cycle time, usually measured in processor cycles) memory to a faster memory, which may generally be referred to as prefetching (e.g., prefetching data). For example, data to be operated on by a processor (e.g., via a later in program order instruction) may be loaded into a cache (e.g., cache memory) from a system (e.g., main) memory. Cache (e.g., all or one or more levels of level L1, L2, L3, L4, etc.) may be part (e.g., on die) of a hardware processor. In one embodiment, cache is static random access memory (SRAM). System memory may be a separate component from the hardware processor, e.g., memory accessible by the processor via a bus. In one embodiment, system memory is dynamic random access memory (DRAM) and/or an external (from the processor) memory (e.g., a mass storage device). System memory may be slower (e.g., by at least 1, 2, 3, 4, 5, 6, 7, 8, 9, or 10 orders of magnitude) in access and/or cycle time (e.g., in completing requested loads and/or stores therein) than a cache. As used herein, a cache line may generally refer to a block (e.g., a sector) of data that may be managed as a unit for coherence purposes. A cache line may include multiple, discrete elements, e.g., elements of a vector.

Prefetching data (e.g., a prefetch) to a cache (e.g., from system memory or from a lower level of a cache to a higher level of cache, such as from L3 to L2 or L1 cache) may minimize the amount of time the processor spends waiting (e.g., being idle) for that data. A prefetch may reduce the memory access latency in a hardware processor. Certain processing operations (e.g., stencil computations) may include relatively large (e.g., larger than a cache's or cache level's capacity) volumes of data. This may cause processing delays, for example, where a hardware processor's request for the data (e.g., a cache line of data) from a cache is a miss (e.g., the cache line is not in the cache or in the requested cache level) and the data is loaded in an operation that is slower than a load from that cache. A cache may be smaller (e.g., by at least 1, 2, 3, 4, 5, 6, 7, 8, 9, 10, 100, or 1000 orders of magnitude) than a system memory.

A stencil computation (e.g., operation) is one example of an operation (e.g., vector computation) that is commonly found in scientific computation, financial services, and seismic imaging performed by a hardware processor. A stencil computation has a general from of:

$$A[i] = \sum_{k=-L}^{L} A[i+k] \quad (1)$$

where each element (e.g., node) may have its own data, for example, to form a weighted contribution from certain adjacent elements. A stencil computation may be performed on a multidimensional block (e.g., subset) of elements from a multidimensional array, e.g., using a processor to operate on vector data, such as, but not limited to, with SIMD vectors and/or SIMD hardware. An element may generally refer to a discrete section of data that represents a single value. For example, a 512 bit cache line may have 16 elements with 32 bits for each element, 64 elements with 8 bits for each element, etc. Certain embodiments herein may assume a multidimensional array or multidimensional block of elements is flattened into a single dimensional array or block of elements in memory. Although certain embodiments of this disclosure are discussed in reference to a stencil, this is merely an example of one application of this disclosure. Additional non-limiting examples of applications of this disclosure are discussed below. FIG. 1 illustrates a sparse three-dimensional (3D) stencil 100 according to embodiments of the disclosure. For example, this stencil 100 may be used to calculate a new value for element 105 based on the values of the 6*k elements that are covered by (e.g., in) this stencil (e.g., a weighted contribution from those 6*k adjacent elements), where k is the half width of the stencil. As illustrated with reference to FIG. 1, sparse may refer to not all elements being present of the entire block (e.g., a cube here would be there entire block) of data defined by the outermost elements of the multidimensional block of elements (e.g., a (2*k+1)*(2*k+1) element cube, which is a 9*9*9 (729) element cube as depicted).

A multidimensional (e.g., a two-dimensional, three-dimensional, four-dimensional, etc.) array may be of any size, for example, an order of magnitude or more in size compared to a stencil's dimensions. For example, a stencil may be moved to new elements in the multidimensional array to calculate the new value for those new elements based on the previous (e.g., adjacent) elements. In one embodiment, a multidimensional array is populated with elements by a previous process, e.g., using database population methods. In one embodiment, each element of a multidimensional array is four bytes. In one embodiment, each element of a multidimensional array is eight bytes. In one embodiment, each element of a multidimensional array is sixteen bytes. In one embodiment, each element of a multidimensional array is the same size as an element of a cache line. In one embodiment, each element of a multidimensional block of elements is the same size as an element of a cache line. In one embodiment, each element in a multidimensional block of elements is the same size as each element of a multidimensional array.

A (e.g., single) prefetch instruction (e.g., macro-instruction) may allow a hardware processor (e.g., a prefetch unit thereof) to prefetch a multidimensional block of elements from a multidimensional array into a cache. Some non-limiting formats of such an instruction follow. In certain embodiments, a prefetch instruction includes a data field (e.g., an operand or operands) that indicates (e.g., to the processor) a system (e.g., virtual) memory address of an (e.g., starting or center) element of the multidimensional block of elements, a stride (e.g., in one or more dimensions) of the multidimensional block of elements, boundaries (e.g., and the shape) of the multidimensional block of elements, or any combinations thereof. In one embodiment, that address is a center of a stencil, e.g., element 105 in FIG. 1. In one embodiment, that address is a boundary element of a stencil, e.g., element 101x or 109x in FIG. 1 when k is 4. A stride (e.g., a step size or increment) of an array may generally refer to the number of (e.g., virtual or physical) addresses in memory between the beginning of one element and the beginning of the next element. A stride may be measured or in units of the size of the array's elements (e.g., cells). In one embodiment, a stride is larger than the element size thus indicating extra space between adjacent elements. In certain embodiments, a prefetch instruction may indicate the stride for all or certain dimensions of the multidimensional block of elements (e.g., resultant array) and/or the multidimensional (e.g., source) array, for example, a stride may be indicated by a data field (e.g., operand or operands) of the prefetch instruction. For example, a stride in a first dimension may be in the form of S1(stride value), a stride in a second dimension may be in the form S2(stride value), etc. in an operand field in a prefetch instruction to indicate the stride in each dimension, in certain dimensions, or in one dimension. A uniform stride in a first and second dimension may be in the form of S12(immediate stride value). A uniform stride in a first, second, and third dimension may be in the form of S123(immediate stride value). Although parenthesis are used here, any format of operand may be utilized.

In one embodiment, boundaries may be the addresses of the outermost dimensions of a multidimensional block and/or multidimensional array. In one embodiment, the boundary or boundaries may be the number of elements in each dimension, e.g., as measured against the element(s) of the known system memory address. For example, if given the address for a center element 105 in FIG. 1 and the dimension k, the boundaries may be determined. Further, the boundaries (or a stream of code representing the boundaries) may be used to determine the address of the other elements in the multidimensional block of elements (e.g., the sparse stencil 100 in FIG. 1). Boundaries may be different in each dimension of multiple dimensions.

In certain embodiments, a prefetch instruction may indicate which level of cache (e.g., level 1 (L1), level 2, (L2), level 3 (L3), level 4 (L4), etc.) to load the multidimensional block of elements into, for example, via the opcode and/or any data field (e.g., operand or operands). For example, the text of "L1", "L2", "L3", "L4", or other operand may be included in an operand field in a prefetch instruction to indicate the target level of cache. In one embodiment, a prefetch may include prefetching data from system memory (or prefetching the system memory addresses for that data) to a cache or prefetching from one level of cache to a higher level of cache (e.g., from L3 to L2 or L1).

Example formats of a prefetch instruction (e.g., depicted in programming language and not machine language) are provided below in Table 1.

TABLE 1

Example instruction formats:

| Opcode | Operands | |
|---|---|---|
| PREFETCH2D | base, region, stride, target cache | (1) |
| PREFETCH3D | base, region, stride, target cache | (2) |
| PREFETCH | dimension, base, region, stride, target cache | (3) |
| 2D_BLOCK_PREFETCHx | [A], k, n1 | (4) |
| 2D_BLOCK_CENTER_PREFETCHx | [A], k, n1 | (5) |
| 3D_BLOCK_SPARSE_PREFETCHx | [A], k, n1, n2 | (6) |
| 3D_BLOCK_PREFETCHx | [A], k, n1, n2 | (7) |

Note the numbers in parenthesis at the end are merely to aid in the discussion below and are not part of the operand fields. The opcode names are merely examples and other names may be used. An operand may be an immediate value, an address, a register (e.g., a single vector register for all operands or multiple registers for an operand or operands), etc. Although certain operands are listed with certain opcodes, the disclosure is not so limited, e.g., the opcodes and operand(s) may be utilized in any combination. A prefetch instruction may use memory, for example, system memory or a register (e.g., a single instruction multiple data (SIMD) register), to hold all or various operands. In one embodiment, an operand is stored in each element of a multiple data register. In one embodiment, an operand is stored in each of multiple registers. A prefetch instruction may include an operand indicating additional information about the region, for example, data type sizes (e.g., the bit size of each element).

In reference to example instruction format (1), the opcode PREFETCH2D may cause a hardware processor (e.g., as discussed herein) to prefetch a two-dimensional (2D) block of elements from a multidimensional (e.g., 2D or 3D) array. The operand field of base may indicate (e.g., encode) the base (e.g., system memory) address of the two-dimensional block of elements that are to be fetched into (e.g., the target) cache from a multidimensional array located in the system memory by execution of the instruction. In one embodiment, the operand field of base is the starting element, e.g., not necessarily an element on a boundary. The operand field of region (which may be in a single register or multiple registers, etc.) may indicate (e.g., encode) the dimensions (e.g., height and width) of the 2D region that is to be fetched into (e.g., the target) cache from a multidimensional array located in the system memory by execution of the instruction. In one embodiment, the operand field of region is the number of bits or elements in each of the width (e.g., the x direction in Cartesian coordinates) and the height (e.g., the y direction in in Cartesian coordinates). The operand field of stride may indicate (e.g., encode) the stride (e.g., in bits or number of elements) of the multidimensional block of elements to be prefetched and/or the multidimensional array in system memory. The stride may be different in each of the two dimensions, e.g., the stride data field may include a first stride for one dimension (e.g., the x direction in Cartesian coordinates) and a second stride for a second dimension (e.g., the y direction in Cartesian coordinates). The operand field of target cache may indicate (e.g., encode) the identification of the (e.g., target) cache (e.g., cache level) that the two-dimensional block of elements are to be fetched (e.g., loaded) into cache from a multidimensional array located in the system memory by execution of the instruction. In one embodiment, the operand field of target cache is the last level cache or L3. Execution of such an instruction may prefetch into cache the entire rectangle of height by width of the system memory region starting with the base address and using stride(s) between corresponding rows and/or columns of the rectangular region.

In reference to example instruction format (2), the opcode PREFETCH3D may cause a hardware processor (e.g., as discussed herein) to prefetch a three-dimensional (3D) block of elements from a multidimensional (e.g., 3D or 4D) array. The operand field of base may indicate (e.g., encode) the base (e.g., system memory) address of the three-dimensional block of elements that are to be fetched into (e.g., the target) cache from a multidimensional array located in the system memory by execution of the instruction. In one embodiment, the operand field of base is the starting element, e.g., not necessarily an element on a boundary. The operand field of region (which may be in a single register or multiple registers, etc.) may indicate (e.g., encode) the dimensions (e.g., height, width, and depth) of the 3D region that is to be fetched into (e.g., the target) cache from a multidimensional array located in the system memory by execution of the instruction. In one embodiment, the operand field of region is the number of bits or elements in each of the height (e.g., the z direction in Cartesian coordinates), the width (e.g., the x direction in Cartesian coordinates), and the depth (e.g., the y direction in in Cartesian coordinates). The operand field of stride may indicate (e.g., encode) the stride (e.g., in bits or number of elements) of the multidimensional block of elements to be prefetched and/or the multidimensional array in system memory. The stride may be different in each of two dimensions or three dimensions, e.g., the stride data field may including a first stride for one dimension (e.g., the x direction in Cartesian coordinates), a second stride for a second dimension (e.g., the y direction in Cartesian coordinates), and a third stride for a third dimension (e.g., the z direction in Cartesian coordinates). The operand field of target cache may indicate (e.g., encode) the identification of the (e.g., target) cache (e.g., cache level) that the three-dimensional block of elements are to be fetched (e.g., loaded) into cache from a multidimensional array located in the system memory by execution of the instruction. In one embodiment, the operand field of target cache is the last level cache or L3. Execution of such an instruction may prefetch into cache the entire cuboid of height by width by depth of the system memory region starting including the base address and using stride(s) between corresponding elements of the rectangular region.

In reference to example instruction format (3), the opcode PREFETCH may cause a hardware processor (e.g., as discussed herein) to prefetch a multidimensional block of elements from a multidimensional array with the number of dimensions being an operand field, e.g., instead of being part of the opcode. For example, the PREFETCH instruction with an operand field of dimension being 2 may function as the PREFETCH2D instruction above. For example, the PREFETCH instruction with an operand field of dimension being 3 may function as the PREFETCH3D instruction above. The operand field of dimension may be 2, 3, 4, 5, 6, 7, 8, 9, etc., and may include scaling the operands, e.g., scaling (e.g., modifying) the stride operand(s) and/or the region operand to define the boundaries of the multidimensional block of elements to be prefetched. In one embodiment, the stride for one or more dimensions (e.g., each dimension) of the multidimensional block of elements to be prefetched may be an immediate value and/or stored in memory, e.g., in a register.

In reference to example instruction format (4), the opcode 2D_BLOCK_PREFETCHx may cause a hardware processor (e.g., as discussed herein) to prefetch a two-dimensional (2D) block (e.g., square) of elements from a multidimensional (e.g., 2D or 3D) array. The operand field of [A] may indicate (e.g., encode) the base (e.g., system memory) address of the two-dimensional block of elements that are to be fetched into (e.g., the target) cache from a multidimensional array located in the system memory by execution of the instruction. In one embodiment, the operand field of [A] is the starting element, e.g., an element on a boundary. The operand field of k, e.g., which may refer to a half width, (or corresponding to a full width of (2*k+1) in at least one dimension of a multidimensional block of elements, e.g., as in stencil 100 in FIG. 1) may indicate (e.g., encode) the dimensions (e.g., height and width) of the 2D region that is to be fetched into (e.g., the target) cache from a multidimensional array located in the system memory by execution of the instruction. In one embodiment, the operand field of k indicates that (2*k+1) is the number of bits or elements in each of the width (e.g., the x direction in Cartesian coordinates) and the height (e.g., the y direction in in Cartesian coordinates). The operand field of n1 may indicate (e.g., encode) the stride (e.g., in bits or number of elements) of the multidimensional block of elements to be prefetched and/or the multidimensional array in system memory. The stride may be different in each of the two dimensions, e.g., the stride data field n1 may include a first stride for one dimension (e.g., the x direction in Cartesian coordinates) and a second stride for a second dimension (e.g., the y direction in Cartesian coordinates). The opcode field of x may indicate (e.g., encode) the identification of the (e.g., target) cache (e.g., cache level) that the two-dimensional block of elements are to be fetched (e.g., loaded) into cache from a multidimensional array located in the system memory by execution of the instruction. Alternatively, x may be in an operand field. In one embodiment, the operand field of target cache is the last level cache or L3. Execution of such an instruction may prefetch into cache the entire square of height by width of the system memory region starting at the base address and using stride(s) between corresponding rows and/or columns of the rectangular region. For example, this instruction may prefetch into cache level "x" (where x is a variable) a number 2*k+1 elements (e.g., cache lines) starting from address A (e.g., as specified by the first operand). The set of k elements (e.g., cache lines) prefetched may be square extending in each dimension as [A], [A+n1], [A+2*n1], . . . [A+(k−1)*n1].

In reference to example instruction format (5), the opcode 2D_BLOCK_CENTER_PREFETCHx may cause a hardware processor (e.g., as discussed herein) to prefetch a two-dimensional (2D) block (e.g., square) of elements from a multidimensional (e.g., 2D or 3D) array. The operand field of [A] may indicate (e.g., encode) the base (e.g., system memory) address of the two-dimensional block of elements that are to be fetched into (e.g., the target) cache from a multidimensional array located in the system memory by execution of the instruction. In one embodiment, the operand field of [A] is the center element, e.g., element 105 in FIG. 1, of the square of the multidimensional block of elements. Other operands may be included, e.g., as discussed in reference to example instruction format (4) above. For example, this instruction may prefetch into cache level "x" (where x is a variable) a number k elements (e.g., cache lines) including (e.g., in the center) address A (e.g., as specified by the first operand). The set of k elements (e.g., cache lines) prefetched may be a square extending in each dimension as [A−k*n1] to [A+k*n1].

A data field, e.g., operand n1, may include a direction for a multidimensional block to extend towards, e.g., (+ or −) x, y, or, z in 3D.

In reference to example instruction format (6), the opcode 3D_BLOCK_SPARSE_PREFETCHx may cause a hardware processor (e.g., as discussed herein) to prefetch a sparse three-dimensional (sparse 3D) block of elements from a multidimensional (e.g., 3D or 4D) array. The operand field of [A] may indicate (e.g., encode) the base (e.g., system memory) address of the three-dimensional block of (sparse) elements that are to be fetched into (e.g., the target) cache from a multidimensional array located in the system memory by execution of the instruction. In one embodiment, the operand field of [A] is the starting element, e.g., an element in the center of the sparse block. The operand field of k (e.g., which may refer to a half width or to a full width of (2*k+1) in at least one dimension of a multidimensional block of elements) may indicate (e.g., encode) the dimensions (for example, the height, width, and depth, e.g., all of the same value) of the 3D sparse block that is to be fetched into (e.g., the target) cache from a multidimensional array located in the system memory by execution of the instruction. In one embodiment, the operand field of (2*k+1) is the number of bits or elements in each of the width (e.g., the x direction in Cartesian coordinates), the height (e.g., the z direction in in Cartesian coordinates), and the depth (e.g., the y direction in Cartesian coordinates). The operand fields of n1 and n2 may indicate (e.g., encode) the stride (e.g., in bits or number of elements) in a first direction and a second direction, respectively, of the multidimensional block of elements to be prefetched and/or the multidimensional array in system memory. The stride may be different in each of the two dimensions, e.g., the stride data field may include a first stride n1 for one dimension (e.g., the x direction in Cartesian coordinates) and a second stride n2 for a second dimension (e.g., the y direction in Cartesian coordinates). The stride in the third direction may be n1*n2. For example, if the starting element is A[x,y,z] and the element to go to is A[x,y,z+1], the distance between them is A[x,y,z]+n1*n2*size of element. The opcode field of x may indicate (e.g., encode) the identification of the (e.g., target) cache (e.g., cache level) that the sparse three-dimensional block of elements are to be fetched (e.g., loaded) into cache from a multidimensional array located in the system memory by execution of the instruction. Alternatively, x may be in an operand field. In one embodiment, the operand field of target p0cache is the last level cache or L3. Execution of such an instruction may prefetch into cache the three intersecting one dimensional arrays (e.g., at right angles to each other) of height by width by depth of the system memory region including the base address and using stride(s) between corresponding rows and/or columns of the region. For example, this instruction may prefetch into cache level "x" (where x is a variable) a number 6*k+1 of elements (e.g., cache lines) including address A (e.g., as specified by the first operand). The set of k elements (e.g., cache lines) prefetched may be the sparse 3D block extending in each dimension as [A−k*n1] to [A+k*n1], e.g., as in stencil 100 in FIG. 1.

In reference to example instruction format (7), the opcode 3D_BLOCK_PREFETCHx may cause a hardware processor (e.g., as discussed herein) to prefetch a three-dimensional (3D) block from a multidimensional (e.g., 3D or 4D) block. The operand field of [A] may indicate (e.g., encode) the base (e.g., system memory) address of the three-dimensional block of elements that are to be fetched into (e.g., the target) cache from a multidimensional array located in the system memory by execution of the instruction. In one embodiment, the operand field of [A] is the starting element, e.g., an element in the center of the sparse block. The operand field of k (e.g., which may refer to a half width or to a full width of (2*k+1) in at least one dimension of a multidimensional block of elements (e.g., a stencil) may indicate (e.g., encode) the dimensions (for example, the height, width, and depth, e.g., all of the same value) of the 3D block that is to be fetched into (e.g., the target) cache from a multidimensional array located in the system memory by execution of the instruction. In one embodiment, the operand field of k indicates that (2*k+1) is the number of bits or elements in each of the width (e.g., the x direction in Cartesian coordinates), the height (e.g., the z direction in in Cartesian coordinates), and the depth (e.g., the y direction in Cartesian coordinates). The operand fields of n1 and n2 may indicate (e.g., encode) the stride (e.g., in bits or number of elements) in a first direction and a second direction, respectively, of the multidimensional block of elements to be prefetched and/or the multidimensional array in system memory. The stride may be different in each of the two dimensions, e.g., the stride data field may include a first stride n1 for one dimension (e.g., the x direction in Cartesian coordinates) and a second stride n2 for a second dimension (e.g., the y direction in Cartesian coordinates). The stride to the third direction may be n1*n2. The opcode field of x may indicate (e.g., encode) the identification of the (e.g., target) cache (e.g., cache level) that the sparse three-dimensional block of elements are to be fetched (e.g., loaded) into cache from a multidimensional array located in the system memory by execution of the instruction. Alternatively, x may be in an operand field. In one embodiment, the operand field of target cache is the last level cache or L3. Execution of such an instruction may prefetch into cache the cuboid of height by width by depth of the system memory region including the base address and using stride(s) between corresponding rows and/or columns of the region. For example, this instruction may prefetch into cache level "x" (where x is a variable) a number (2*k+1)*(2*k+1)*(2*k+1) of elements (e.g., cache lines) starting at (e.g., corner) address A (e.g., as specified by the first operand). The set of k elements (e.g., cache lines) prefetched may be the cuboid formed from [A], [A+n1], [A+2*n1] ..., [A+(k−1)*n1], [A+n1*n2], [A+n1*n2+n1], ... [A+(k−1)*n1*n2+(k−1)*n1]. Alternatively, this instruction may be replaced by a quantity (2*k+1) of the 2D_BLOCK_PREFETCHx instructions.

Although the target cache (e.g., the identification of the cache to load the multidimensional block of elements into) is shown above (e.g., as target cache or x), it is not required, for example, no target cache field may be present. Additionally or alternatively, the target cache may be implicit in the operand, e.g., a prefetch opcode may indicate to the hardware processor executing the instruction (e.g., during decoding) that the target cache is a certain cache level (e.g., L1, L2, L3, L4, etc.). In one embodiment, the target cache for the instruction is the same for an opcode that the particular opcode indicates the target cache to the hardware processor, e.g., the target cache is always a certain cache level (e.g., L1, L2, L3, L4, etc.).

Figure 2:
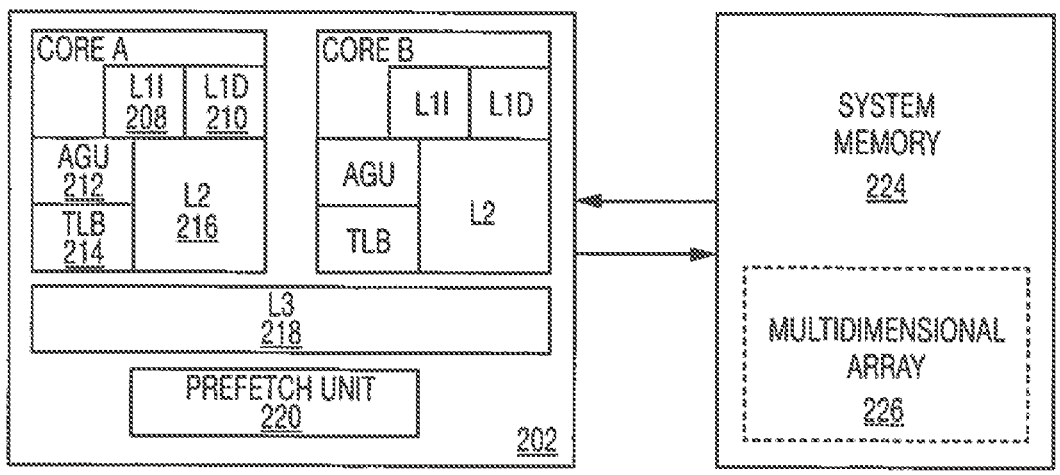
FIG. 2 illustrates a block diagram of a multiple core hardware processor with a prefetch unit according to embodiments of the disclosure.

FIG. 2 illustrates a block diagram 200 of a multiple core hardware processor 202 with a prefetch unit 220 according to embodiments of the disclosure. Any processor may include a prefetch unit, e.g., the processors discussed below. FIG. 2 illustrates an embodiment of multiple processor cores (core A and core B) and multiple levels of caches (L1, L2, and L3), e.g., in a cache coherency hierarchy. Although two cores are depicted, a single or more than two cores may be utilized. Although multiple levels of cache are depicted, a single, or any number of caches may be utilized. Cache(s) may be organized in any fashion, for example, as a physically or logically centralized or distributed cache.

In an embodiment, a processor, such as a processor or processors including the processor cores illustrated in the Figures, or any other processor, may include one or more caches. FIG. 2 illustrates an embodiment of a three level (e.g., levels 1 (L1), 2 (L2), and 3 (L3)) cache. A processor may include at least one core and at least one un-core. In one embodiment, multiple cores (core A and B) are of a single processor 202. A core (e.g., core A and core B) may include the components of a processor to execute instructions. An un-core may include all logic not in a core. A processor core (e.g., core A) may include components such as a level 1 instruction cache (L1I) 208 and a level 1 data cache (L1D) 210. A core (e.g., core A) may include components such as an address generation unit (AGU) 212, translation lookaside buffer (TLB) 214, and a level 2 cache (L2) 216. A core may or may not share a cache with other cores, e.g., core A and core B may share the level 3 cache (L3) 218 but not the L2

216 or L1 (208.210). A core may include any combination of these components or none of these components. Processor 202 (e.g., core A and core B) may access (e.g., load and store) data in the system memory 224, e.g., as indicated by the arrows. In one embodiment, the system memory 224 communicates with the core over a bus, e.g., at a slower access and/or cycle time than the core accessing cache (e.g. cache on the processor 202). System memory 224 may include a multidimensional array 226, e.g., loaded into the system memory 224 previously to the execution of a prefetch instruction.

An address generation unit (e.g., AGU 212), for example, address computation unit (ACU), may refer to an execution unit inside a processor (e.g., a core) that calculates addresses used to access memory (e.g., system memory 224), for example, to allow the core to access the system memory. In one embodiment, the AGU takes an address stream (e.g., equations) as an input and outputs the (e.g., virtual) addresses for that stream. An AGU (e.g., circuit) may perform arithmetic operations, such as addition, subtraction, modulo operations, or bit shifts, for example, utilizing an adder, multiplier, shifter, rotator, etc. thereof.

A translation lookaside buffer (e.g., TLB 214) may convert a virtual address to a physical address (e.g., of the system memory). A TLB may include a data table to store (e.g., recently used) virtual-to-physical memory address translations, e.g., such that the translation does not have to be performed on each virtual address present to obtain the physical memory address. If the virtual address entry is not in the TLB, a processor may perform a page walk to determine the virtual-to-physical memory address translation.

Prefetch unit 220 may be a separate functional unit, e.g., not utilizing the functional units (e.g., execution unit, Arithmetic Logic Unit (ALU), AGU, TLB, etc.) of a core. Prefetch unit may be utilized by a prefetch instruction (e.g., as disclosed herein). Prefetch unit may include circuitry and/or hardware logic to perform the prefetching discussed herein. Prefetch unit may be part of a processor (e.g., on the un-core). Prefetch unit may communicate with the core(s) of the processor, e.g., via communication resources (not shown), such as, but not limited to, a ring network. Processor 202 may communicate with the system memory 224 and/or caches (e.g., L1, L2, or L3 in FIG. 2) via a memory controller (e.g., as part of the processor) and/or an interconnect. Prefetch unit 220 may output a system memory addresses of the multidimensional block of elements that is to-be-loaded (e.g., copied) into cache (e.g., L1, L2, or L3 in FIG. 2) from multidimensional array 226 in system memory 224. Prefetch unit 220 may output the system memory addresses to the memory controller (not shown) of processor 202.

Figure 3:
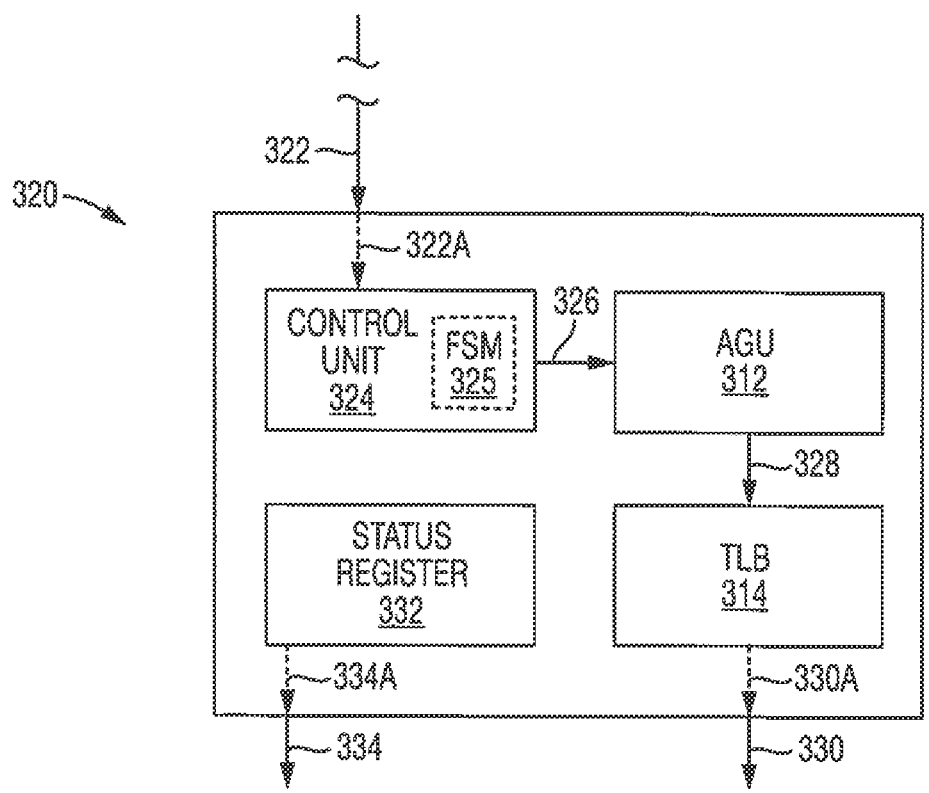
FIG. 3 illustrates a block diagram of a prefetch unit according to embodiments of the disclosure.

FIG. 3 illustrates a block diagram of a hardware prefetch unit 320 according to embodiments of the disclosure. A hardware prefetch unit may include any combination or none of the elements shown. For example, prefetch unit may only include a control unit 324 (or control unit logic) to take as input the specifications (e.g., dimension, base address, region boundaries, stride, and/or target cache) of the multidimensional block of elements to prefetch into cache and/or output (e.g., via logic or a state machine, such as a finite state machine (FSM)) the (e.g., physical) system memory addresses of the multidimensional block of elements, for example, to move that data of the multidimensional block of elements into the cache. In one embodiment, the output of system memory addresses (e.g., memory request) is sent to a queue or buffer of a memory control unit (e.g., memory controller), for example, to complete those requests.

In one embodiment, the hardware prefetch unit may connect to the system memory and cause the move of the multidimensional block of elements into the cache (e.g., without utilizing a core's resources).

In one embodiment, a prefetch unit is separate from the execution unit and/or processor pipeline (e.g., 900 in FIG. 9). For example, a prefetch instruction may be executed (e.g., initiated) by the execution unit and thereafter utilize the prefetch unit to obtain the system memory addresses of the multidimensional block of element to be placed into the cache without the addresses being generated in a (e.g., execution unit of) a core of the processor.

In FIG. 3, depicted prefetch unit 320 includes an input 322. Input 322 may be the specifications (e.g., dimension, base address, region boundaries, stride, and/or target cache) of the multidimensional block of elements to prefetch into cache. Specifications may be the operand and/or opcode data from the prefetch instruction. Input 322A (optional) may connect directly to the control unit 324 to provide the specifications and/or include a queue. Control unit 324 may include the logic to convert the specifications into virtual addresses. In one embodiment, control unit 324 includes a finite state machine (FSM 325) to convert the specifications into virtual addresses. For example, a FSM having a state (or set of states) for each multidimensional block size (e.g., 2D, 3D, 4D, etc.) and utilizing certain states of the FSM to output an address stream (e.g., equations) accordingly for the specifications. For example, in reference to example instruction format (4) for the 2D_BLOCK_PREFETCHx opcode, the address stream may include [A], [A+n1], [A+2*n1], ... [A+(k−1)*n1] and supplying the values for A, k, and n1.

The address stream may be output 326 to an Address Generation Unit 312. An AGU may be prefetch unit's AGU 312 or a core's AGU (e.g., AGU 212 in FIG. 2). An AGU may generate a (e.g., virtual) address from the address stream. As noted above, an AGU's hardware circuit may include arithmetic or other hardware components, e.g., an adder, multiplier, shift register, etc. The virtual addresses for the (e.g., entire) stream may then be output 328 (e.g., sequentially) into the transition lookaside buffer (TLB) 314 (or other component to convert a virtual address into an address format that that the processor may use to access the system memory (e.g., system memory 224 in FIG. 2)). In FIG. 3, TLB 314 may receive the virtual addresses and convert them into physical addresses. In one embodiment, a TLB may be prefetch unit's TLB 314 or a core's TLB (e.g., TLB 214 in FIG. 2). The physical addresses may be output from the prefetch unit 320, e.g., via output 330 or directly from the TLB via 300A. A queue may be included at 330 or 330A. As an optional feature, a prefetch unit 320 may include a status register 332 (or other status indicator) such that a component or user may query the status register 332 to determine the state of the prefetch unit. In one embodiment, a status register 332 may indicate e.g., via output 334A, that the current prefetch operation is in progress, completed, failed, etc. In one embodiment, a status register 332 may indicate that the prefetch unit is busy or not busy. In one embodiment, an output from the status register and/or an input query may occur via prefetch unit output 334. Control unit 324 may control (e.g., update) the status register 332.

Note that in the use of arrows for communication herein, a single direction arrow may allow communication in either direction (e.g., to transmit and/or receive a signal).

Figure 4:
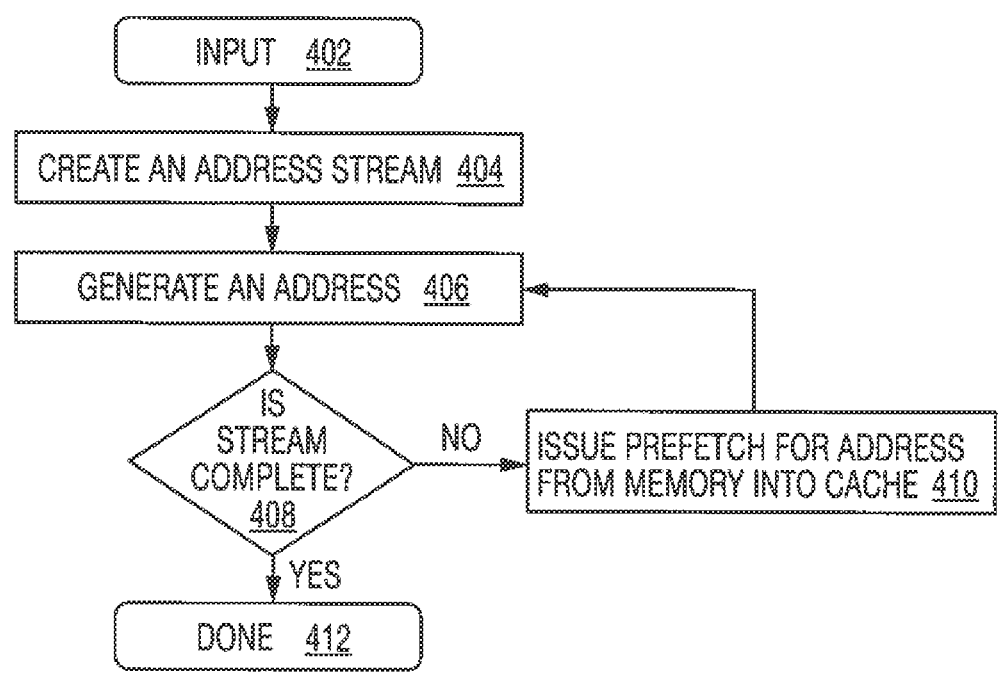
FIG. 4 illustrates a flow diagram of prefetching a multidimensional block of elements from a multidimensional array according to embodiments of the disclosure.

FIG. 4 illustrates a flow diagram 400 of prefetching a multidimensional block of elements from a multidimensional array according to embodiments of the disclosure. Input 402 may be the specifications (e.g., dimension, base address, region boundaries, stride, and/or target cache) of the multidimensional block of elements to be prefetched. Those specifications may then be used to create an address stream 404 (e.g., by the control unit 324). The address stream may then be used to generate the (e.g., virtual) addresses. The stream may iterate at 408 until all addresses of the stream are prefetched 410 into the cache, that is, until done (e.g., completed) 412. In one embodiment, prefetch logic (e.g., a FSM) may control the performance of certain or all of the actions in flow diagram 400.

As a further example, below are three possible hardware logic (e.g., FSM) implementations. First, logic (e.g., FSM) may include an integer adder (and/or multiplier, etc.) to calculate addresses (e.g., address A (base address)+64; see the address streams above for other examples) and a TLB to translate the virtual address into a physical address prior to sending to the memory subsystem (e.g., controller). In this implementation, the FSM may be self-contained and may be developed as a separate functional unit inside the processor. In one embodiment, the prefetch unit's TLB is kept coherent with the processor's TLB(s). Secondly, the logic (e.g., FSM) may contain the AGU (e.g., integer adder) to generate the virtual addresses and the virtual addresses may then be fed into the processor's memory pipeline for virtual to physical translation (e.g., via a TLB) and/or queued for cache and system memory accesses (e.g., alternating each). Thirdly, the logic (e.g., FSM) may include a control unit to generate an address stream but utilize the processor core's AGU to generate the virtual address of the system memory and the processor core's TLB to generate physical system memory requests to be queued for cache and system memory accesses.

Figure 5:
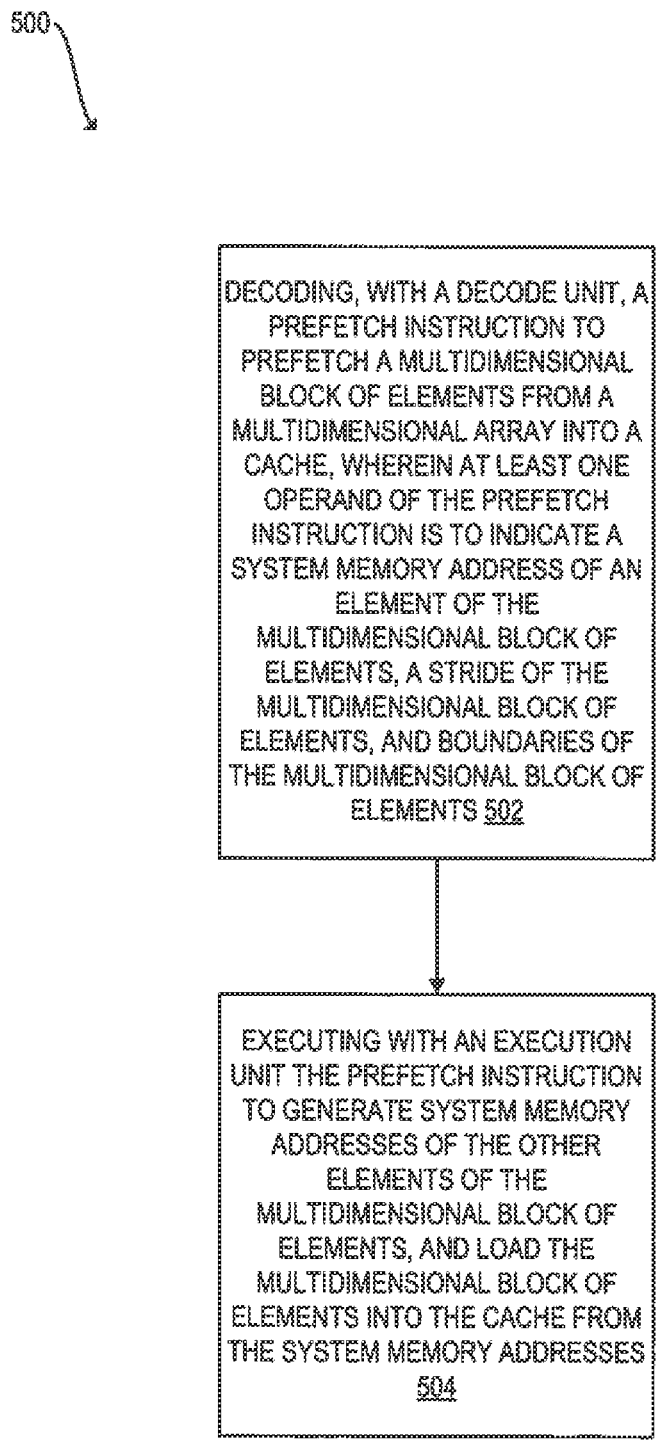
FIG. 5 illustrates a flow diagram of prefetching a multidimensional block of elements from a multidimensional array according to embodiments of the disclosure.

FIG. 5 illustrates a flow diagram 500 of prefetching a multidimensional block of elements from a multidimensional array according to embodiments of the disclosure. The flow diagram includes decoding, with a decode unit, a prefetch instruction to prefetch a multidimensional block of elements from a multidimensional array into a cache, wherein at least one operand of the prefetch instruction is to indicate a system memory address of an element of the multidimensional block of elements, a stride of the multidimensional block of elements, and boundaries of the multidimensional block of elements 502, and executing with an execution unit the prefetch instruction to: generate system memory addresses of the other elements of the multidimensional block of elements, and load the multidimensional block of elements into the cache from the system memory addresses 504.

Hardware prefetch methods and apparatuses disclosed herein may be utilized on regularly shaped (e.g., 1D, 2D, or 3D) blocks of data using regular access patterns within these blocks. Adjacent blocks may either be contiguous (e.g., in a convolution application) or non-contiguous (e.g., in sparse solver, sparse block matrix vector multiplication, or seismic modeling and prediction applications).

In certain embodiments, a prefetch instruction may prefetch the multidimensional block of elements to one or more of the cache levels. In one embodiment, the cache level is a victim cache. A victim cache may be the last level cache (LLC), for example, L3 218 in FIG. 2. In one example, a (e.g., macro-) instruction prefetches the multidimensional block of elements from system memory into a victim cache. As a processor (e.g., core) may look through the caches (e.g., from highest (e.g. L1 in FIG. 2) to lowest (e.g., L3 in FIG. 2) for data (e.g., a cache line) before accessing the (e.g., much slower) system memory, a prefetch to the victim cache may allow the processor to access that data without accessing the system memory and without providing other notice to the processor that the data in question is in the cache. In another embodiment, the prefetch of the multidimensional block of elements may include notifying the processor (e.g., cores) that the multidimensional block of elements are loaded into the cache (e.g., using a tag directory of those cache lines in the cache).

In one embodiment where a speculative prefetch data set may have been generated and placed into the cache, the prefetch instructions, methods, and and apparatuses discussed herein may replace that speculative prefetch data set in the cache with the multidimensional block of elements. Replacing existing (e.g., non-utilizable) cache may be useful, for example, owing to the limited size of the cache relative to the size of (e.g., the speculative prefetch data set and/or) the multidimensional block of elements, the limited resources for fetching data from system memory, and the power consumption caused by incorrect prefetches In one embodiment, the speculative prefetch data set and the multidimensional block of elements correspond to the same future instruction that is to operate on this data.

In certain embodiments, hardware prefetch methods and apparatuses disclosed herein may generate multiple memory requests with non-constant difference between the (e.g., virtual) addresses, for example, not merely contiguous virtual addresses for the entire multidimensional block of elements. In certain embodiments, hardware methods and apparatuses herein do not merely generate random numbers, but instead may target a specific fixed pattern (e.g., as discussed herein).

In certain embodiments, hardware prefetch methods and apparatuses disclosed herein may reduce the cache miss rate and improve performance for operations that operate on randomly located in memory (e.g., regularly shaped (1D, 2D, or 3D)) blocks of elements, e.g., of different sized blocks. While the access pattern within each block may be regular (e.g., sequential or strided), as the operation (e.g., stencil operation) moves to the next such block, the access pattern may become interrupted and a speculative prefetch engine may require the learning of another access pattern (e.g., causing the correct data in a new block to not be in the cache) within the new block as opposed to a prefetch instruction that allows the prefetching of a (e.g., programmer) defined multidimensional block of elements as disclosed herein.

Consider for example, prefetching that requires seeing the same stride three times in order to learn the stream and start speculatively prefetching with that stride. After moving to a new block, an operation may experience three misses of the data in the cache. If the data comes from memory, assuming 300 cycles latency for memory access, the processor pipeline may stall up to 1000 cycles. If the computation within a block takes 500 cycles, there is a factor of 3 performance loss (e.g., 1500/500) compared to the case when data is available in the cache by or before the time the operation on that data is being executed.

In one embodiment, sparse linear is a direct method to solve a sparse system of equations $M*x=b$. In one implementation, an array (e.g., matrix) M is reordered. Further, columns of the reordered matrix may be partitioned into super-blocks, e.g., where each superblock is a small subset of consecutive columns with the same non-zero structure. Due to the same non-zero structure, these superblocks may be stored as relatively long and narrow dense matrices, e.g., with additional indexing data structures to access individual rows/columns of super block. The width and height of these matrices may depend on a non-zero structure, as well as their location within the matrix. Supernodes on one side (e.g., the left) may be (e.g., much) smaller than super nodes on the other side (e.g., the right). In one example, supernode sizes differ between 1×1 and 512×16. To expose parallelism on multi-core processors, (e.g., larger) supernodes may be further divided into (e.g., smaller) dense matrices of variable dimension. As both supernodes may be accessed in random fashion, e.g., as dictated by an elimination tree order, a speculative prefetch may not prefetch the correct data, e.g., owing to not capturing the random transitions from one supernode to another and thus prefetch beginning at the next supernode. In addition, the sizes of the supernodes may be small and/or different. A supernode may include a triangular 2D array. Certain embodiments herein may allow prefetching of supernode data (e.g., for a triangular 2D region).

Embodiments of this disclosure allow for prefetching of data for geometric multigrid methods (e.g., to prefetch cells of a grid level); convolution-based kernels such as, but not limited to, those in Intel® Integrated Performance Primitives (IPP); high-order methods in computational fluid dynamics (CFD); and high performance implementation of Basic Linear Algebra Subprograms (e.g., BLAS3) dense linear algebra kernels. Although prefetching by certain embodiments herein may be utilized for convolution, this disclosure is not so limited. For example, certain embodiments may be utilized to prefetch data that does not exhibit sequential or nearly sequential access patterns.

In one embodiment, the prefetch operands for multiple prefetch instructions according to this disclosure are stored in separate memory locations (e.g., in registers), and each prefetch instruction may be executed on its respective set of operands to provide each set of prefetched data, for example, at a desired time. In certain embodiments, this may allow for the prefetching of multidimensional blocks of elements where each block is of a different, non-sequential (e.g., irregular) access pattern from other (e.g., previously accessed) blocks.

In yet another embodiment, spatial adaptivity in 3D may be realized by flexible unstructured polyhedral (e.g., tetrahedral or hexahedral) meshes, e.g., in seismic modeling and prediction applications. Tetrahedral meshes may form a multidimensional array, e.g., of four triangular faces. Hexahedral meshes may form a multidimensional array, e.g., of six faces. Certain embodiments herein may allow prefetching of that data (e.g., for a face of a mesh). For example, methods and apparatuses of this disclosure may provide a prefetching operator for the global operators and time-integrated unknowns. The access structure may be defined by the mesh (e.g., it is known at runtime but not at compile time). While the $i^{th}$ face of a polyhedron (e.g., tetrahedron or hexahedron) is processed, this disclosure may provide a range-prefetch of the matrices needed for the $(i+1)^{th}$ face. As the required matrices may have varying sizes (e.g., depending on the sparsity pattern of the matrix), a 2D prefetch may be utilized.

In one embodiment, sparse matrix-vector multiplication using a block compressed row (BCR) format and multiple right-hand sides may include non-contiguous blocks of a multidimensional array. Certain embodiments herein may allow prefetching of that non-contiguous data.

In one embodiment, a hardware processor includes a decoder to decode a prefetch instruction to prefetch a multidimensional block of elements from a multidimensional array into a cache, wherein at least one operand of the prefetch instruction is to indicate a system memory address of an element of the multidimensional block of elements, a stride of the multidimensional block of elements, and boundaries of the multidimensional block of elements, and an execution unit to execute the prefetch instruction to: generate system memory addresses of the other elements of the multidimensional block of elements, and load the multidimensional block of elements into the cache from the system memory addresses. The execution unit may execute the prefetch instruction to cause a hardware prefetch unit to: generate system memory addresses of the other elements of the multidimensional block of elements, and/or load the multidimensional block of elements into the cache from the system memory addresses. The hardware processor may include a prefetch unit to generate the system memory addresses of the other elements of the multidimensional block of elements from a state machine. The prefetch unit may include an adder to generate the system memory addresses of the other elements of the multidimensional block of elements. The prefetch unit may include an address generation unit to generate the system memory addresses of the other elements of the multidimensional block of elements. The at least one operand of the instruction may indicate a level of the cache to load the multidimensional block of elements. The stride may include a first stride in a first dimension and a different, second stride in a second dimension. The execution unit may load the multidimensional block of elements into a victim cache. The execution unit may replace a speculative prefetch data set in the cache with the multidimensional block of elements.

In another embodiment, a method includes decoding, with a decode unit, a prefetch instruction to prefetch a multidimensional block of elements from a multidimensional array into a cache, wherein at least one operand of the prefetch instruction is to indicate a system memory address of an element of the multidimensional block of elements, a stride of the multidimensional block of elements, and boundaries of the multidimensional block of elements, and executing with an execution unit the prefetch instruction to: generate system memory addresses of the other elements of the multidimensional block of elements, and load the multidimensional block of elements into the cache from the system memory addresses. The method may include providing a prefetch unit to generate the system memory addresses of the other elements of the multidimensional block of elements from a state machine. The prefetch unit may include an adder to generate the system memory addresses of the other elements of the multidimensional block of elements. The prefetch unit may include an address generation unit to generate the system memory addresses of the other elements of the multidimensional block of elements. The at least one operand of the instruction may indicate a level of the cache to load the multidimensional block of elements. The stride may include a first stride in a first dimension and a different, second stride in a second dimension. The execution unit may load the multidimensional block of elements into a victim cache. The execution unit may replace a speculative prefetch data set in the cache with the multidimensional block of elements.

In yet another embodiment, an apparatus includes a set of one or more processors, and a set of one or more data storage devices that stores code, that when executed by the set of processors causes the set of one or more processors to perform the following: decoding, with a decode unit, a prefetch instruction to prefetch a multidimensional block of elements from a multidimensional array into a cache, wherein at least one operand of the prefetch instruction is to indicate a system memory address of an element of the multidimensional block of elements, a stride of the multidimensional block of elements, and boundaries of the multidimensional block of elements, and executing with an execution unit the prefetch instruction to: generate system memory addresses of the other elements of the multidimensional block of elements, and load the multidimensional block of elements into the cache from the system memory addresses. The set of data storage devices may further store code, that when executed by the set of processors causes the set of processors to perform the following: further comprising providing a prefetch unit to generate the system memory addresses of the other elements of the multidimensional block of elements from a state machine. The set of data storage devices may further store code, that when executed by the set of processors causes the set of processors to perform the following: wherein the prefetch unit further comprises an adder to generate the system memory addresses of the other elements of the multidimensional block of elements. The set of data storage devices may further store code, that when executed by the set of processors causes the set of processors to perform the following: wherein the prefetch unit further comprises an address generation unit to generate the system memory addresses of the other elements of the multidimensional block of elements. The set of data storage devices may further store code, that when executed by the set of processors causes the set of processors to perform the following: wherein the at least one operand of the instruction is to indicate a level of the cache to load the multidimensional block of elements. The set of data storage devices may further store code, that when executed by the set of processors causes the set of processors to perform the following: wherein the stride comprises a first stride in a first dimension and a different, second stride in a second dimension. The set of data storage devices may further store code, that when executed by the set of processors causes the set of processors to perform the following: wherein the execution unit is to load the multidimensional block of elements into a victim cache. The set of data storage devices may further store code, that when executed by the set of processors causes the set of processors to perform the following: wherein the execution unit is to replace a speculative prefetch data set in the cache with the multidimensional block of elements.

In another embodiment, a hardware processor includes means to decode a prefetch instruction to prefetch a multidimensional block of elements from a multidimensional array into a cache, wherein at least one operand of the prefetch instruction is to indicate a system memory address of an element of the multidimensional block of elements, a stride of the multidimensional block of elements, and boundaries of the multidimensional block of elements, and means to execute the prefetch instruction to: agenerate system memory addresses of the other elements of the multidimensional block of elements, and load the multidimensional block of elements into the cache from the system memory addresses.

In yet another embodiment, a machine readable storage medium includes code, that when executed causes a machine to perform a method disclosed herein.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 6A:
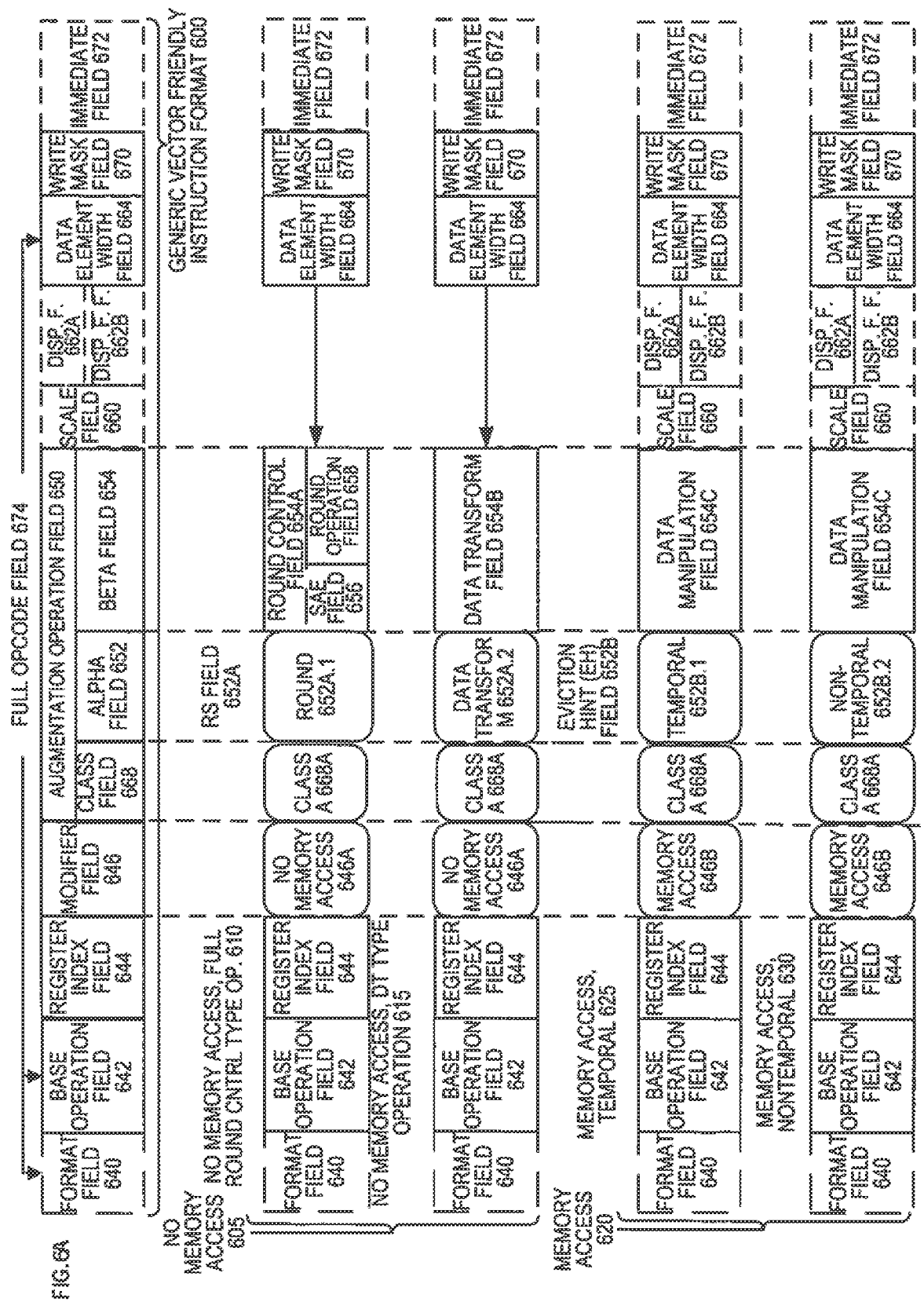
FIG. 6A is a block diagram illustrating a generic vector friendly instruction format and class A instruction templates thereof according to embodiments of the disclosure.

FIGS. 6A-6B are block diagrams illustrating a generic vector friendly instruction format and instruction templates thereof according to embodiments of the disclosure. FIG. 6A is a block diagram illustrating a generic vector friendly instruction format and class A instruction templates thereof according to embodiments of the disclosure; while FIG. 6B is a block diagram illustrating the generic vector friendly instruction format and class B instruction templates thereof according to embodiments of the disclosure. Specifically, a generic vector friendly instruction format 600 for which are defined class A and class B instruction templates, both of which include no memory access 605 instruction templates and memory access 620 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 6A include: 1) within the no memory access 605 instruction templates there is shown a no memory access, full round control type operation 610 instruction template and a no memory access, data transform type operation 615 instruction template; and 2) within the memory access 620 instruction templates there is shown a memory access, temporal 625 instruction template and a memory access, non-temporal 630 instruction template. The class B instruction templates in FIG. 6B include: 1) within the no memory access 605 instruction templates there is shown a no memory access, write mask control, partial round control type operation 612 instruction template and a no memory access, write mask control, vsize type operation 617 instruction template; and 2) within the memory access 620 instruction templates there is shown a memory access, write mask control 627 instruction template.

The generic vector friendly instruction format 600 includes the following fields listed below in the order illustrated in FIGS. 6A-6B.

Format field 640—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 642—its content distinguishes different base operations.

Register index field 644—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 646—its content distinguishes occurrences of instructions in the generic vector instruction format that specify memory access from those that do not; that is, between no memory access 605 instruction templates and memory access 620 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 650—its content distinguishes which one of a variety of different operations to be performed in addition to the base operation. This field is context specific. In one embodiment of the disclosure, this field is divided into a class field 668, an alpha field 652, and a beta field 654. The augmentation operation field 650 allows common groups of operations to be performed in a single instruction rather than 2, 3, or 4 instructions.

Scale field 660—its content allows for the scaling of the index field's content for memory address generation (e.g., for address generation that uses $2^{scale}*index+base$).

Displacement Field 662A—its content is used as part of memory address generation (e.g., for address generation that uses $2^{scale}*index+base+displacement$).

Displacement Factor Field 662B (note that the juxtaposition of displacement field 662A directly over displacement factor field 662B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 674 (described later herein) and the data manipulation field 654C. The displacement field 662A and the displacement factor field 662B are optional in the sense that they are not used for the no memory access 605 instruction templates and/or different embodiments may implement only one or none of the two.

Data element width field 664—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 670—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 670 allows for partial vector operations, including loads, stores, arithmetic, logical, etc. While embodiments of the disclosure are described in which the write mask field's 670 content selects one of a number of write mask registers that contains the write mask to be used (and thus the write mask field's 670 content indirectly identifies that masking to be performed), alternative embodiments instead or additional allow the mask write field's 670 content to directly specify the masking to be performed.

Immediate field 672—its content allows for the specification of an immediate. This field is optional in the sense that is it not present in an implementation of the generic vector friendly format that does not support immediate and it is not present in instructions that do not use an immediate.

Class field 668—its content distinguishes between different classes of instructions. With reference to FIGS. 6A-B, the contents of this field select between class A and class B instructions. In FIGS. 6A-B, rounded corner squares are used to indicate a specific value is present in a field (e.g., class A 668A and class B 668B for the class field 668 respectively in FIGS. 6A-B).

Instruction Templates of Class A

In the case of the non-memory access 605 instruction templates of class A, the alpha field 652 is interpreted as an RS field 652A, whose content distinguishes which one of the different augmentation operation types are to be performed (e.g., round 652A.1 and data transform 652A.2 are respectively specified for the no memory access, round type operation 610 and the no memory access, data transform type operation 615 instruction templates), while the beta field 654 distinguishes which of the operations of the specified type is to be performed. In the no memory access 605 instruction templates, the scale field 660, the displacement field 662A, and the displacement scale filed 662B are not present.

No-Memory Access Instruction Templates—Full Round Control Type Operation

In the no memory access full round control type operation 610 instruction template, the beta field 654 is interpreted as a round control field 654A, whose content(s) provide static rounding. While in the described embodiments of the disclosure the round control field 654A includes a suppress all floating point exceptions (SAE) field 656 and a round operation control field 658, alternative embodiments may support may encode both these concepts into the same field or only have one or the other of these concepts/fields (e.g., may have only the round operation control field 658).

SAE field 656—its content distinguishes whether or not to disable the exception event reporting; when the SAE field's 656 content indicates suppression is enabled, a given instruction does not report any kind of floating-point exception flag and does not raise any floating point exception handler.

Round operation control field 658—its content distinguishes which one of a group of rounding operations to perform (e.g., Round-up, Round-down, Round-towards-zero and Round-to-nearest). Thus, the round operation control field 658 allows for the changing of the rounding mode on a per instruction basis. In one embodiment of the disclosure where a processor includes a control register for specifying rounding modes, the round operation control field's 650 content overrides that register value.

No Memory Access Instruction Templates—Data Transform Type Operation

In the no memory access data transform type operation 615 instruction template, the beta field 654 is interpreted as a data transform field 654B, whose content distinguishes which one of a number of data transforms is to be performed (e.g., no data transform, swizzle, broadcast).

In the case of a memory access 620 instruction template of class A, the alpha field 652 is interpreted as an eviction hint field 652B, whose content distinguishes which one of the eviction hints is to be used (in FIG. 6A, temporal 652B.1 and non-temporal 652B.2 are respectively specified for the memory access, temporal 625 instruction template and the memory access, non-temporal 630 instruction template), while the beta field 654 is interpreted as a data manipulation field 654C, whose content distinguishes which one of a number of data manipulation operations (also known as primitives) is to be performed (e.g., no manipulation; broadcast; up conversion of a source; and down conversion of a destination). The memory access 620 instruction templates include the scale field 660, and optionally the displacement field 662A or the displacement scale field 662B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 652 is interpreted as a write mask control (Z) field 652C, whose content distinguishes whether the write masking controlled by the write mask field 670 should be a merging or a zeroing.

In the case of the non-memory access 605 instruction templates of class B, part of the beta field 654 is interpreted as an RL field 657A, whose content distinguishes which one of the different augmentation operation types are to be performed (e.g., round 657A.1 and vector length (VSIZE) 657A.2 are respectively specified for the no memory access, write mask control, partial round control type operation 612 instruction template and the no memory access, write mask control, VSIZE type operation 617 instruction template), while the rest of the beta field 654 distinguishes which of the operations of the specified type is to be performed. In the no memory access 605 instruction templates, the scale field 660, the displacement field 662A, and the displacement scale filed 662B are not present.

In the no memory access, write mask control, partial round control type operation 610 instruction template, the rest of the beta field 654 is interpreted as a round operation field 659A and exception event reporting is disabled (a given instruction does not report any kind of floating-point exception flag and does not raise any floating point exception handler).

Round operation control field 659A—just as round operation control field 658, its content distinguishes which one of a group of rounding operations to perform (e.g., Round-up, Round-down, Round-towards-zero and Round-to-nearest). Thus, the round operation control field 659A allows for the changing of the rounding mode on a per instruction basis. In one embodiment of the disclosure where a processor includes a control register for specifying rounding modes, the round operation control field's 650 content overrides that register value.

In the no memory access, write mask control, VSIZE type operation 617 instruction template, the rest of the beta field 654 is interpreted as a vector length field 659B, whose content distinguishes which one of a number of data vector lengths is to be performed on (e.g., 128, 256, or 512 byte).

In the case of a memory access 620 instruction template of class B, part of the beta field 654 is interpreted as a broadcast field 657B, whose content distinguishes whether or not the broadcast type data manipulation operation is to be performed, while the rest of the beta field 654 is interpreted the vector length field 659B. The memory access 620 instruction templates include the scale field 660, and optionally the displacement field 662A or the displacement scale field 662B.

With regard to the generic vector friendly instruction format 600, a full opcode field 674 is shown including the format field 640, the base operation field 642, and the data element width field 664. While one embodiment is shown where the full opcode field 674 includes all of these fields, the full opcode field 674 includes less than all of these fields in embodiments that do not support all of them. The full opcode field 674 provides the operation code (opcode).

The augmentation operation field 650, the data element width field 664, and the write mask field 670 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implemented in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 7 is a block diagram illustrating an exemplary specific vector friendly instruction format according to embodiments of the disclosure. FIG. 7 shows a specific vector friendly instruction format 700 that is specific in the sense that it specifies the location, size, interpretation, and order of the fields, as well as values for some of those fields. The specific vector friendly instruction format 700 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 6 into which the fields from FIG. 7 map are illustrated.

It should be understood that, although embodiments of the disclosure are described with reference to the specific vector friendly instruction format 700 in the context of the generic vector friendly instruction format 600 for illustrative purposes, the disclosure is not limited to the specific vector friendly instruction format 700 except where claimed. For example, the generic vector friendly instruction format 600 contemplates a variety of possible sizes for the various fields, while the specific vector friendly instruction format 700 is shown as having fields of specific sizes. By way of specific example, while the data element width field 664 is illustrated as a one bit field in the specific vector friendly instruction format 700, the disclosure is not so limited (that is, the generic vector friendly instruction format 600 contemplates other sizes of the data element width field 664).

The generic vector friendly instruction format 600 includes the following fields listed below in the order illustrated in FIG. 7A.

EVEX Prefix (Bytes 0-3) 702—is encoded in a four-byte form.

Format Field 640 (EVEX Byte 0, bits [7:0])—the first byte (EVEX Byte 0) is the format field 640 and it contains 0x62 (the unique value used for distinguishing the vector friendly instruction format in one embodiment of the disclosure).

The second-fourth bytes (EVEX Bytes 1-3) include a number of bit fields providing specific capability.

REX field 705 (EVEX Byte 1, bits [7-5])—consists of a EVEX.R bit field (EVEX Byte 1, bit [7]—R), EVEX.X bit field (EVEX byte 1, bit [6]—X), and 657BEX byte 1, bit[5]—B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 610—this is the first part of the REX' field 610 and is the EVEX.R' bit field (EVEX Byte 1, bit [4]—R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In her words, R'Rrrr is formed by combining EVEX.R', EVEX.R, and the other RRR from other fields.

Opcode map field 715 (EVEX byte 1, bit[3:0]—mmmm)—its content encodes an implied leading opcode byte (0F, 0F 38, or 0F 3).

Data element width field 664 (EVEX byte 2, bit [7]—W)—is represented by the notation EVEX.W. EVEX.W is used to define the granularity (size) of the datatype (either 32-bit data elements or 64-bit data elements).

EVEX.vvvv 720 (EVEX Byte 2, bits [6:3]—vvvv)—the role of EVEX.vvvv may include the following: 1) EVEX.vvvv encodes the first source register operand, specified in inverted (1 s complement) form and is valid for instructions with 2 or more source operands; 2) EVEX.vvvv encodes the destination register operand, specified in 1 s complement form for certain vector shifts; or 3) EVEX.vvvv does not encode any operand, the field is reserved and should contain 1111b. Thus, EVEX.vvvv field 720 encodes the 4 low-order bits of the first source register specifier stored in inverted (1 s complement) form. Depending on the instruction, an extra different EVEX bit field is used to extend the specifier size to 32 registers.

EVEX.U 668 Class field (EVEX byte 2, bit [2]—U)—If EVEX.U=0, it indicates class A or EVEX.U0; if EVEX.U=1, it indicates class B or EVEX.U1.

Prefix encoding field 725 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 652 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 654 (EVEX byte 3, bits [6:4]—SSS, also known as EVEX.s2$_{2-0}$, EVEX.r$_{2-0}$, EVEX.rr1, EVEX.LL0, EVEX.LLB; also illustrated with βββ)—as previously described, this field is context specific.

REX' field 610—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 670 (EVEX byte 3, bits [2:0]—kkk)—its content specifies the index of a register in the write mask registers as previously described. In one embodiment of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 730 (Byte 4) is also known as the opcode byte. Part of the opcode is specified in this field.

MOD R/M Field 740 (Byte 5) includes MOD field 742, Reg field 744, and R/M field 746. As previously described, the MOD field's 742 content distinguishes between memory access and non-memory access operations. The role of Reg field 744 can be summarized to two situations: encoding either the destination register operand or a source register operand, or be treated as an opcode extension and not used to encode any instruction operand. The role of R/M field 746 may include the following: encoding the instruction operand that references a memory address, or encoding either the destination register operand or a source register operand.

Scale, Index, Base (SIB) Byte (Byte 6)—As previously described, the scale field's 650 content is used for memory address generation. SIB.xxx 754 and SIB.bbb 756—the contents of these fields have been previously referred to with regard to the register indexes Xxxx and Bbbb.

Displacement field 662A (Bytes 7-10)—when MOD field 742 contains 10, bytes 7-10 are the displacement field 662A, and it works the same as the legacy 32-bit displacement (disp32) and works at byte granularity.

Displacement factor field 662B (Byte 7)—when MOD field 742 contains 01, byte 7 is the displacement factor field 662B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 662B is a reinterpretation of disp8; when using displacement factor field 662B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 662B substitutes the legacy x86 instruction set 8-bit displacement. Thus, the displacement factor field 662B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 672 operates as previously described.

Full Opcode Field

FIG. 7B is a block diagram illustrating the fields of the specific vector friendly instruction format 700 that make up the full opcode field 674 according to one embodiment of the disclosure. Specifically, the full opcode field 674 includes the format field 640, the base operation field 642, and the data element width (W) field 664. The base operation field 642 includes the prefix encoding field 725, the opcode map field 715, and the real opcode field 730.

Register Index Field

FIG. 7C is a block diagram illustrating the fields of the specific vector friendly instruction format 700 that make up the register index field 644 according to one embodiment of the disclosure. Specifically, the register index field 644 includes the REX field 705, the REX' field 710, the MODR/M.reg field 744, the MODR/M.r/m field 746, the VVVV field 720, xxx field 754, and the bbb field 756.

Augmentation Operation Field

FIG. 7D is a block diagram illustrating the fields of the specific vector friendly instruction format 700 that make up the augmentation operation field 650 according to one embodiment of the disclosure. When the class (U) field 668 contains 0, it signifies EVEX.U0 (class A 668A); when it contains 1, it signifies EVEX.U1 (class B 668B). When U=0 and the MOD field 742 contains 11 (signifying a no memory access operation), the alpha field 652 (EVEX byte 3, bit [7]—EH) is interpreted as the rs field 652A. When the rs field 652A contains a 1 (round 652A.1), the beta field 654 (EVEX byte 3, bits [6:4]—SSS) is interpreted as the round control field 654A. The round control field 654A includes a one bit SAE field 656 and a two bit round operation field 658. When the rs field 652A contains a 0 (data transform 652A.2), the beta field 654 (EVEX byte 3, bits [b:4]—SSS) is interpreted as a three bit data transform field 654B. When U=0 and the MOD field 742 contains 00, 01, or 10 (signifying a memory access operation), the alpha field 652 (EVEX byte 3, bit [7]—EH) is interpreted as the eviction hint (EH) field 652B and the beta field 654 (EVEX byte 3, bits [6:4]—SSS) is interpreted as a three bit data manipulation field 654C.

When U=1, the alpha field 652 (EVEX byte 3, bit [7]—EH) is interpreted as the write mask control (Z) field 652C. When U=1 and the MOD field 742 contains 11 (signifying a no memory access operation), part of the beta field 654 (EVEX byte 3, bit [4]—$S_0$) is interpreted as the RL field 657A; when it contains a 1 (round 657A.1) the rest of the beta field 654 (EVEX byte 3, bit [6-5]—$S_{2-1}$) is interpreted as the round operation field 659A, while when the RL field 657A contains a 0 (VSIZE 657.A2) the rest of the beta field 654 (EVEX byte 3, bit [6-5]-$S_{2-1}$) is interpreted as the vector length field 659B (EVEX byte 3, bit [6-5]—$L_{1-0}$). When U=1 and the MOD field 742 contains 00, 01, or 10 (signifying a memory access operation), the beta field 654 (EVEX byte 3, bits [6:4]—SSS) is interpreted as the vector length field 659B (EVEX byte 3, bit [6-5]—$L_{1-0}$) and the broadcast field 657B (EVEX byte 3, bit [4]—B).

Exemplary Register Architecture

Figure 8:
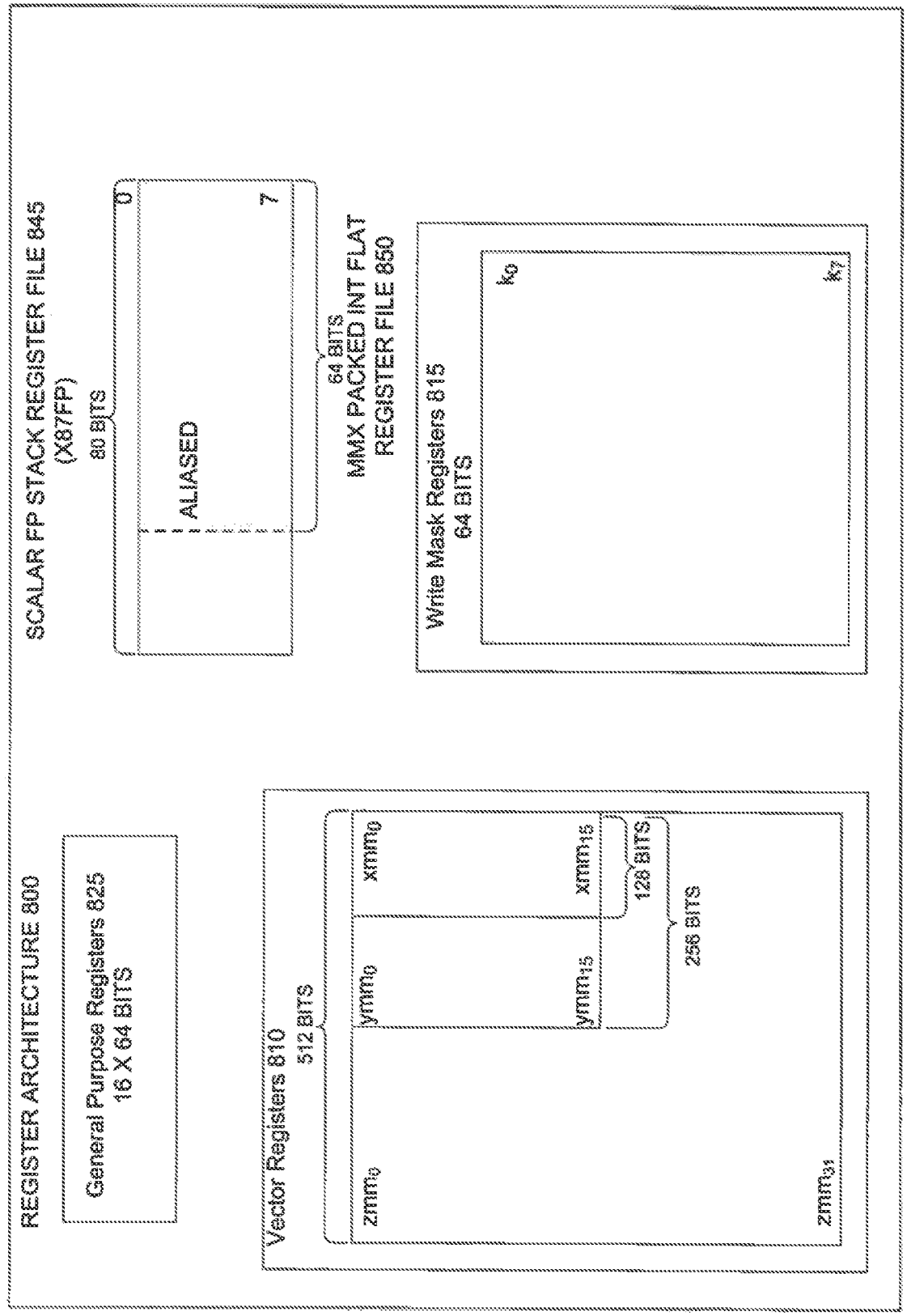
FIG. 8 is a block diagram of a register architecture according to one embodiment of the disclosure

FIG. 8 is a block diagram of a register architecture 800 according to one embodiment of the disclosure. In the embodiment illustrated, there are 32 vector registers 810 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 700 operates on these overlaid register file as illustrated in the below tables.

| Adjustable Vector Length | Class | Operations | Registers |
|---|---|---|---|
| Instruction Templates that do not include the vector length field 659B | A (FIG. 6A; U = 0) | 610, 615, 625, 630 | zmm registers (the vector length is 64 byte) |
| | B (FIG. 6B; U = 1) | 612 | zmm registers (the vector length is 64 byte) |
| Instruction templates that do include the vector length field 659B | B (FIG. 6B; U = 1) | 617, 627 | zmm, ymm, or xmm registers (the vector length is 64 byte, 32 byte, or 16 byte) depending on the vector length field 659B |

In other words, the vector length field 659B selects between a maximum length and one or more other shorter lengths, where each such shorter length is half the length of the preceding length; and instructions templates without the vector length field 659B operate on the maximum vector length. Further, in one embodiment, the class B instruction templates of the specific vector friendly instruction format 700 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 815—in the embodiment illustrated, there are 8 write mask registers (k0 through k7), each 64 bits in size. In an alternate embodiment, the write mask registers 815 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 845, on which is aliased the MMX packed integer flat register file 850—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-Of-Order Core Block Diagram

FIG. 9A is a block diagram illustrating both an exemplary in-order pipeline and an exemplary register renaming, out-of-order issue/execution pipeline according to embodiments of the disclosure. FIG. 9B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point—status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the disclosure. In one embodiment, an instruction decode unit 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the disclosure may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the disclosure. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
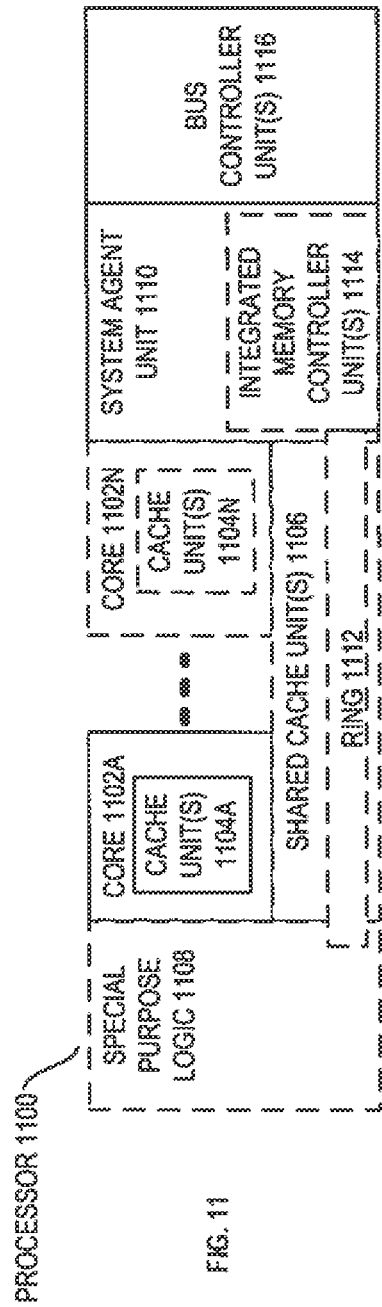
FIG. 11 is a block diagram of a processor that may have more than one core, may have an integrated memory controller, and may have integrated graphics according to embodiments of the disclosure.

FIG. 11 is a block diagram of a processor 1100 that may have more than one core, may have an integrated memory controller, and may have integrated graphics according to embodiments of the disclosure. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12, 13, 14, and 15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
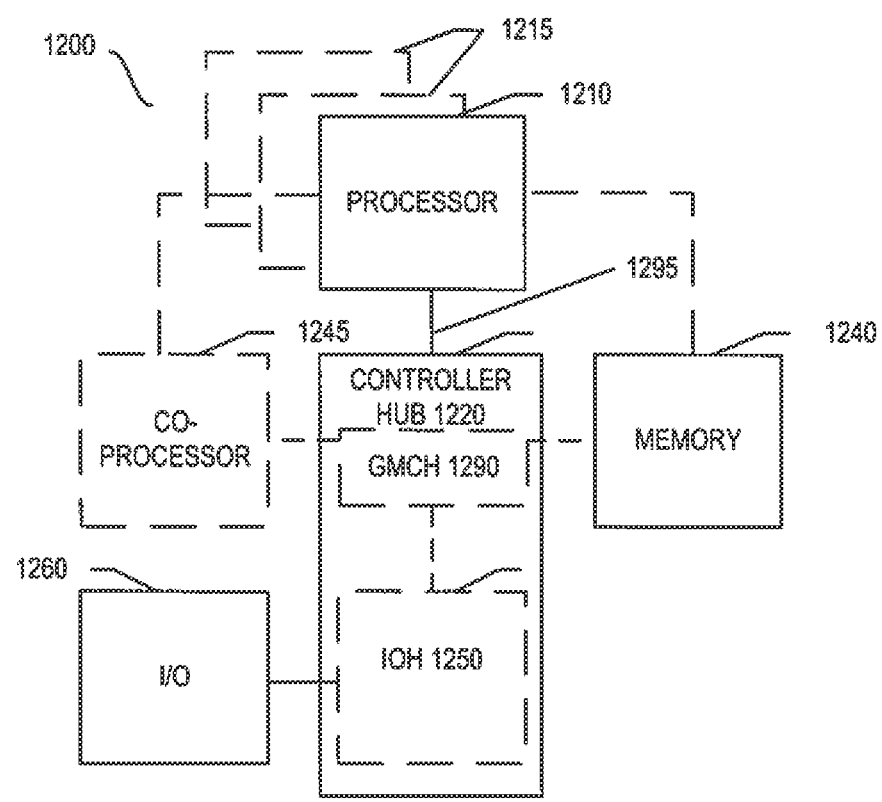
FIG. 12 is a block diagram of a system in accordance with one embodiment of the present disclosure.

Referring now to FIG. 12, shown is a block diagram of a system 1200 in accordance with one embodiment of the present disclosure. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
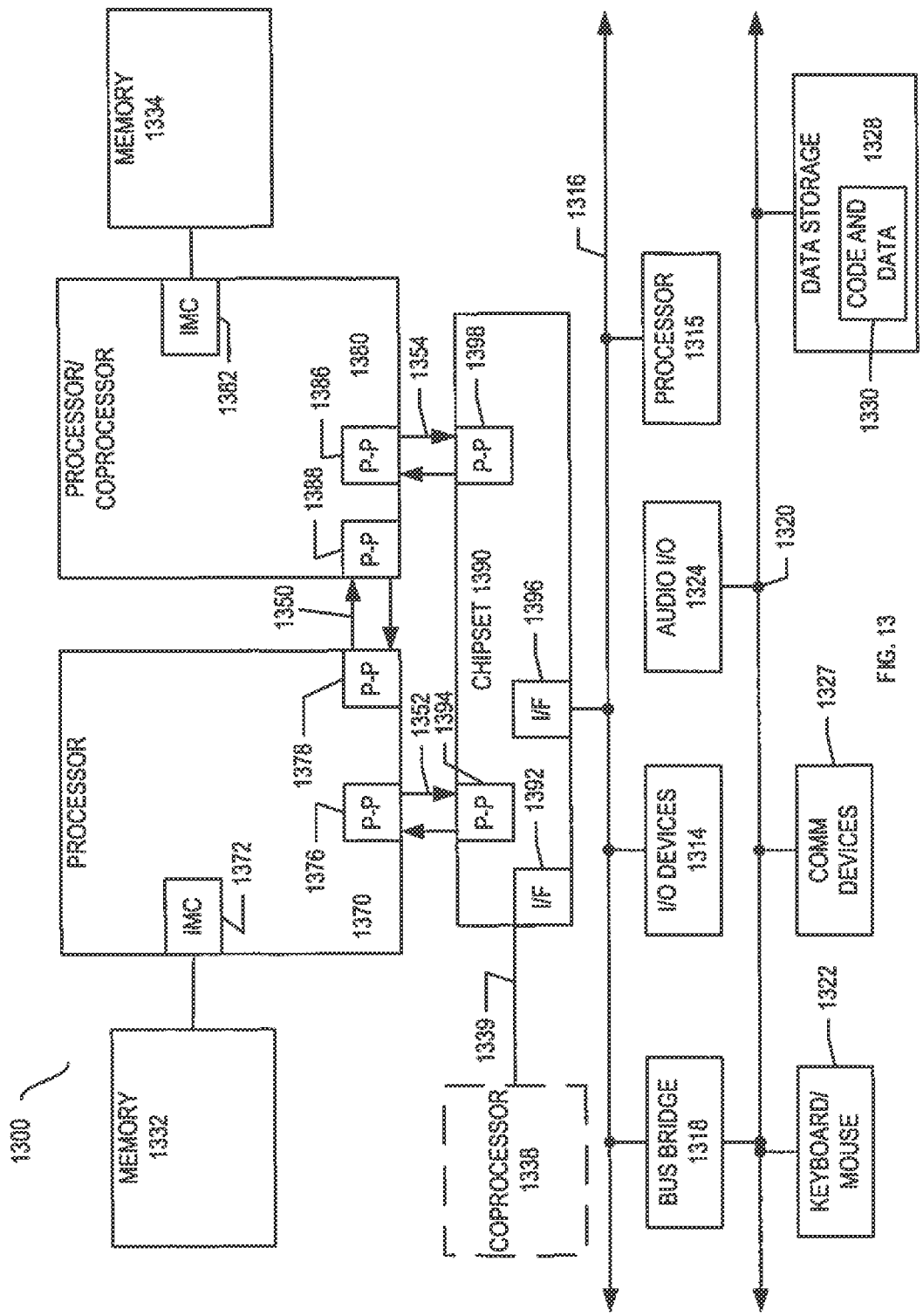
FIG. 13 is a block diagram of a more specific exemplary system in accordance with an embodiment of the present disclosure.

Referring now to FIG. 13, shown is a block diagram of a first more specific exemplary system 1300 in accordance with an embodiment of the present disclosure. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the disclosure, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present disclosure is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
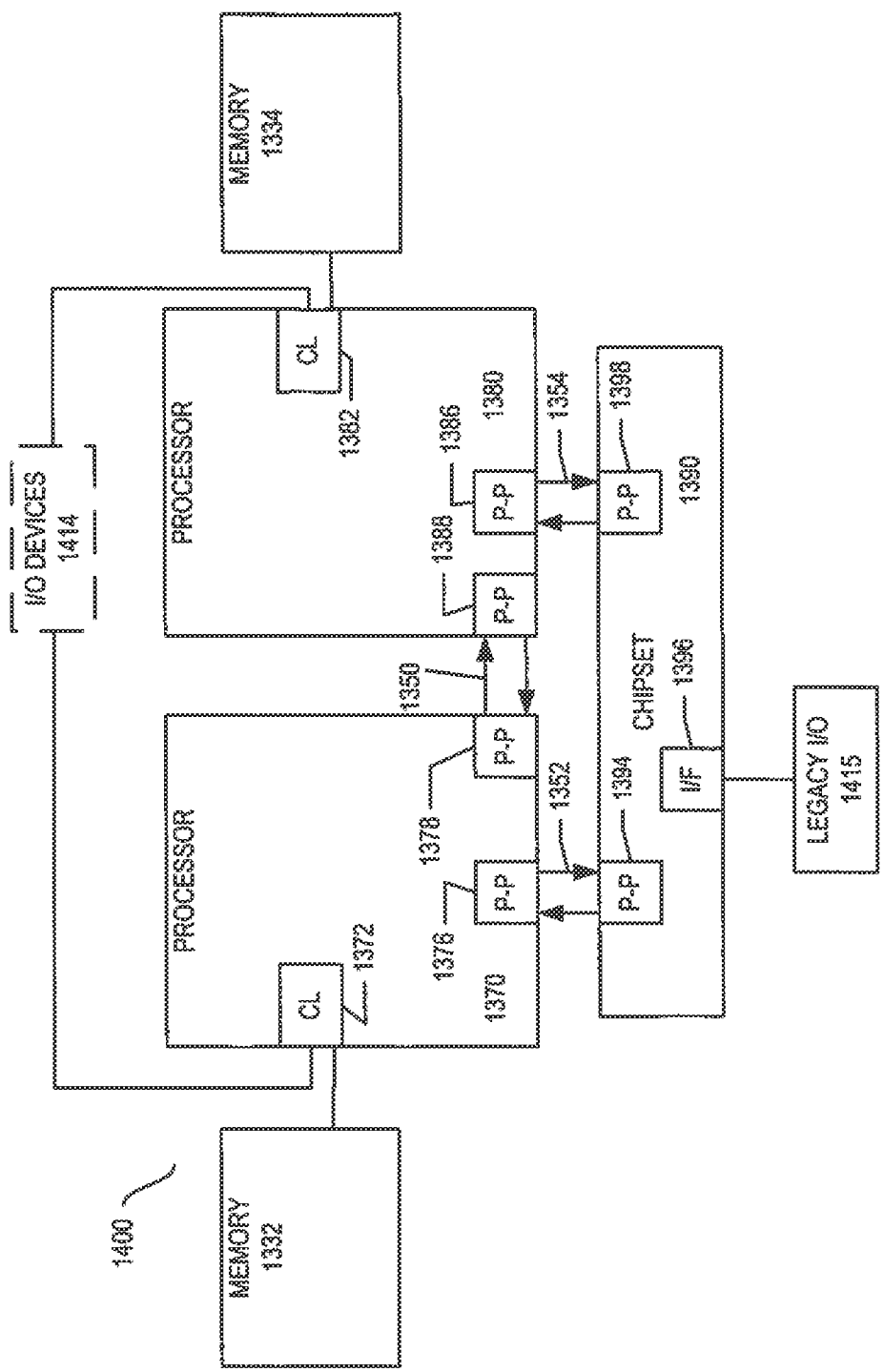
FIG. 14, shown is a block diagram of a second more specific exemplary system in accordance with an embodiment of the present disclosure.

Referring now to FIG. 14, shown is a block diagram of a second more specific exemplary system 1400 in accordance with an embodiment of the present disclosure. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
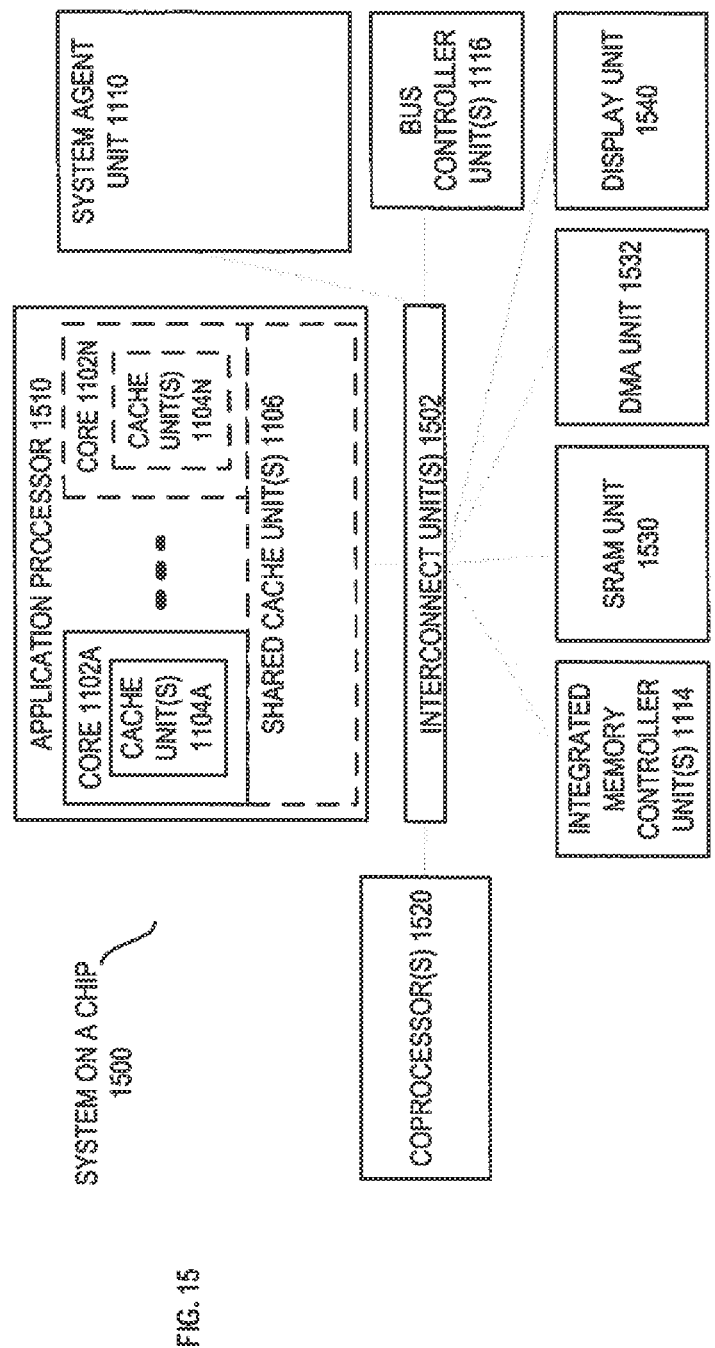
FIG. 15, shown is a block diagram of a system on a chip (SoC) in accordance with an embodiment of the present disclosure.

Referring now to FIG. 15, shown is a block diagram of a SoC 1500 in accordance with an embodiment of the present disclosure. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 202A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 16 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

What is claimed is:

1. A hardware processor comprising:
a decoder to decode an instruction to prefetch a multidimensional block of elements from a multidimensional array into a cache, wherein one or more fields of the instruction are to indicate a memory address of an element of the multidimensional block of elements, a stride of the multidimensional block of elements, and boundaries of the multidimensional block of elements; and
an execution unit to execute the instruction to:
generate memory addresses of the other elements of the multidimensional block of elements, and
load the multidimensional block of elements into the cache from the memory addresses.

2. The hardware processor of claim 1, wherein the execution unit is to execute the instruction to cause a prefetch unit of the hardware processor to generate the memory addresses of the other elements of the multidimensional block of elements.

3. The hardware processor of claim 2, wherein the memory addresses are virtual addresses and the prefetch unit comprises a transition lookaside buffer to generate corresponding physical addresses from the virtual addresses of the memory addresses of the other elements of the multidimensional block of elements.

4. The hardware processor of claim 2, wherein the prefetch unit further comprises a status register to indicate a status of the prefetch unit.

5. The hardware processor of claim 2, wherein the execution unit is to execute the instruction to cause the prefetch unit to load the multidimensional block of elements into the cache from the memory addresses.

6. The hardware processor of claim 1, wherein an opcode of the instruction is to indicate a level of the cache to load the multidimensional block of elements.

7. The hardware processor of claim 1, wherein the stride comprises a first stride in a first dimension and a different, second stride in a second dimension.

8. The hardware processor of claim 1, wherein the execution unit is to execute the instruction to cause a replacement of a speculative prefetch data set in the cache with the multidimensional block of elements.

9. A method comprising:
decoding, with a decode unit of a processor, an instruction to prefetch a multidimensional block of elements from a multidimensional array into a cache, wherein one or more fields of the instruction are to indicate a memory address of an element of the multidimensional block of elements, a stride of the multidimensional block of elements, and boundaries of the multidimensional block of elements; and
executing, with an execution unit of the processor, the instruction to:
generate memory addresses of the other elements of the multidimensional block of elements; and
load the multidimensional block of elements into the cache from the memory addresses.

10. The method of claim 9, wherein the executing the instruction is to cause a prefetch unit of the processor to generate the memory addresses of the other elements of the multidimensional block of elements.

11. The method of claim 10, wherein the memory addresses are virtual addresses and the prefetch unit comprises a transition lookaside buffer generating corresponding physical addresses from the virtual addresses of the memory addresses of the other elements of the multidimensional block of elements.

12. The method of claim 10, further comprising updating a status register of the prefetch unit to indicate a status of the prefetch unit.

13. The method of claim 10, wherein the executing the instruction is to cause the prefetch unit of the processor to load the multidimensional block of elements into the cache from the memory addresses.

14. The method of claim 9, wherein an opcode of the instruction is to indicate a level of the cache to load the multidimensional block of elements.

15. The method of claim 9, wherein the stride comprises a first stride in a first dimension and a different, second stride in a second dimension.

16. The method of claim 9, wherein the executing the instruction replaces a speculative prefetch data set in the cache with the multidimensional block of elements.

17. A non-transitory machine readable medium that stores code that when executed by a machine causes the machine to perform a method comprising:
decoding, with a decode unit of a processor, an instruction to prefetch a multidimensional block of elements from a multidimensional array into a cache, wherein one or more fields of the instruction are to indicate a memory address of an element of the multidimensional block of elements, a stride of the multidimensional block of elements, and boundaries of the multidimensional block of elements; and
executing, with an execution unit of the processor, the instruction to:
generate memory addresses of the other elements of the multidimensional block of elements; and
load the multidimensional block of elements into the cache from the memory addresses.

18. The non-transitory machine readable medium of claim 17, wherein the executing the instruction is to cause a prefetch unit of the processor to generate the memory addresses of the other elements of the multidimensional block of elements.

19. The non-transitory machine readable medium of claim 18, wherein the memory addresses are virtual addresses and the prefetch unit comprises a transition lookaside buffer generating corresponding physical addresses from the virtual addresses of the memory addresses of the other elements of the multidimensional block of elements.

20. The non-transitory machine readable medium of claim 18, further comprising updating a status register of the prefetch unit to indicate a status of the prefetch unit.

21. The non-transitory machine readable medium of claim 18, wherein the executing the instruction is to cause the prefetch unit of the processor to load the multidimensional block of elements into the cache from the memory addresses.

22. The non-transitory machine readable medium of claim 17, wherein an opcode of the instruction is to indicate a level of the cache to load the multidimensional block of elements.

23. The non-transitory machine readable medium of claim 17, wherein the stride comprises a first stride in a first dimension and a different, second stride in a second dimension.

24. The non-transitory machine readable medium of claim 17, wherein the executing the instruction replaces a speculative prefetch data set in the cache with the multidimensional block of elements.

* * * * *